United States Patent
Kanno

(10) Patent No.: US 10,929,067 B2
(45) Date of Patent: Feb. 23, 2021

(54) NONVOLATILE MEMORY SYSTEM AND METHOD FOR CONTROLLING WRITE AND READ OPERATIONS IN THE NONVOLATILE MEMORY BY A HOST

(71) Applicant: TOSHIBA MEMORY CORPORATION, Minato-ku (JP)

(72) Inventor: Shinichi Kanno, Ota (JP)

(73) Assignee: TOSHIBA MEMORY CORPORATION, Minato-ku (JP)

( * ) Notice: Subject to any disclaimer, the term of this patent is extended or adjusted under 35 U.S.C. 154(b) by 0 days.

(21) Appl. No.: 16/564,412

(22) Filed: Sep. 9, 2019

(65) Prior Publication Data
US 2020/0241799 A1 Jul. 30, 2020

(30) Foreign Application Priority Data
Jan. 29, 2019 (JP) .................................. 2019-013220

(51) Int. Cl.
*G06F 3/06* (2006.01)
(52) U.S. Cl.
CPC .......... *G06F 3/0659* (2013.01); *G06F 3/0604* (2013.01); *G06F 3/064* (2013.01); *G06F 3/0679* (2013.01)
(58) Field of Classification Search
CPC ...... G06F 3/0659; G06F 3/0679; G06F 3/064; G06F 3/0604; G06F 3/0656; G06F 3/0688; G06F 3/067; G06F 3/0611
USPC ............................ 711/154, 103, 155; 710/56
See application file for complete search history.

(56) References Cited

U.S. PATENT DOCUMENTS

| 9,092,362 | B1 | 7/2015 | Alcantara et al. | |
|---|---|---|---|---|
| 9,164,888 | B2 | 10/2015 | Borchers et al. | |
| 2016/0266802 | A1 | 9/2016 | Yoshida et al. | |
| 2017/0192903 | A1* | 7/2017 | Kawamura | G06F 12/0246 |
| 2019/0179751 | A1* | 6/2019 | Kanno | G06F 12/0804 |
| 2019/0332316 | A1* | 10/2019 | Kanno | G06F 3/0679 |
| 2020/0241797 | A1* | 7/2020 | Kanno | G06F 3/0679 |

OTHER PUBLICATIONS

Neal Mielke, et al., "Recovery Effects in the Distributed Cycling of Flash Memories", 2006 IEEE Proceedings, 44th Annual International Reliability Physics Symposium, 2006, pp. 29-35.
Yiying Zhang, et al., "De-indirection for Flash-based SSDs with Nameless Writes", 10th USENIX Conference on File and Storage Technologies (FAST '12), 2012, pp. 1-16, https://www.usenix.org/system/files/conference/fast12/zhang.pdf.

* cited by examiner

*Primary Examiner* — Hong C Kim
(74) *Attorney, Agent, or Firm* — Oblon, McClelland, Maier & Neustadt, L.L.P.

(57) ABSTRACT

According to one embodiment, a memory system determines a write destination block and a write destination location in the write destination block to which write data is to be written, and notifies a host of an identifier of the write data, a block address of the write destination block, and an offset indicative of the write destination location. The memory system retrieves the write data from a write buffer of the host, and writes the write data to the write destination location. In a case where a read command to designate a physical address of first data is received before a write operation of the first data is finished, the memory system reads the first data from the write buffer of the host.

12 Claims, 17 Drawing Sheets

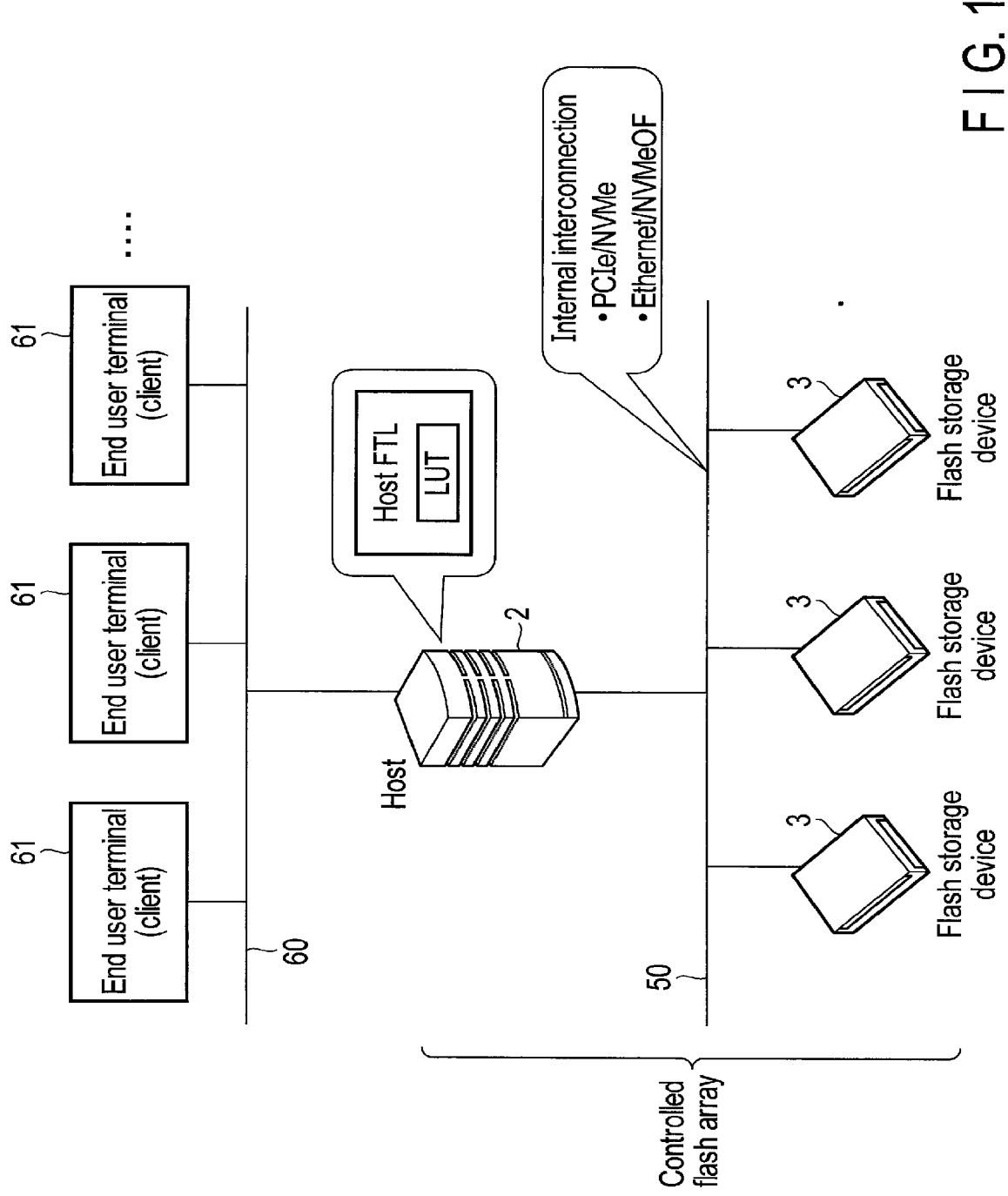
F I G. 1

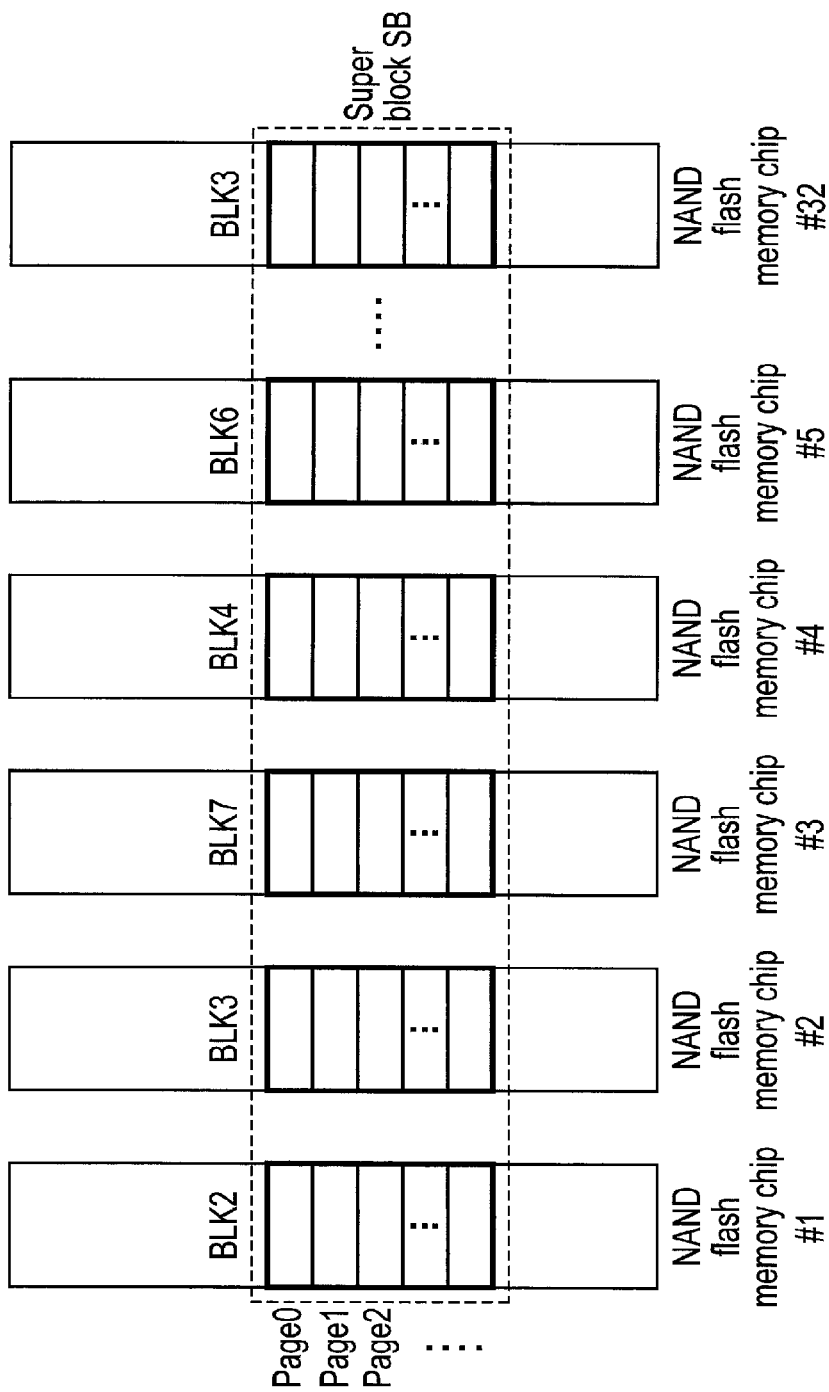
F I G. 5

Write command

|  | Descriptions |
|---|---|
| Command ID | Command ID for write command |
| QoS domain ID | Identifier of QoS domain to which data is to be written |
| Tag | Identifier of data to be written<br>(e.g., LBA, key of key value store, and hash value of key) |
| Length | Length of data to be written |
| Write buffer address | Location in write buffer where data to be written is stored |

FIG. 6

Address record request

|  | Descriptions |
|---|---|
| QoS domain ID | Identifier of QoS domain to which data is to be written |
| Tag | Identifier of data to be written<br>(e.g., LBA, key of key value store, and hash value of key) |
| Physical address | Physical address is indicative of physical storage location to which data is written.<br>Physical address is represented by block address and offset. |
| Length | Length of written data |

FIG. 7

Read command

|  | Descriptions |
|---|---|
| Command ID | Command ID for read command |
| QoS domain ID | Identifier of QoS domain where data to be read is stored |
| Physical address | Physical address is indicative of physical storage location where data to be read is stored. Physical address is represented by block address and offset. |
| Length | Length of data to be read |
| Read buffer address | Location in read buffer to which data is to be transferred |

F I G. 8

QoS domain create command

|  | Descriptions |
|---|---|
| Command ID | Command ID for QoS domain create command |
| QoS domain ID | Identifier of QoS domain to be created |
| Capacity | Capacity of QoS domain to be created |

F I G. 9

Write buffer release request

| | Descriptions |
|---|---|
| Write command ID | Write command identifier corresponding to releasable write data in write buffer<br>(Write buffer release request may include storage location information indicative of releasable region in write buffer) |

F I G. 10

Address change request

| | Descriptions |
|---|---|
| QoS domain ID | Identifier of QoS domain to which data is to be written |
| Tag | Identifier of data to be written |
| Previous physical address | Previous physical address is indicative of physical storage location of which host is already notified. Previous physical address is represented by block address and offset. |
| New physical address | New physical address is indicative of physical storage location to which data is written by write retry. New physical address is represented by block address and offset. |

F I G. 11

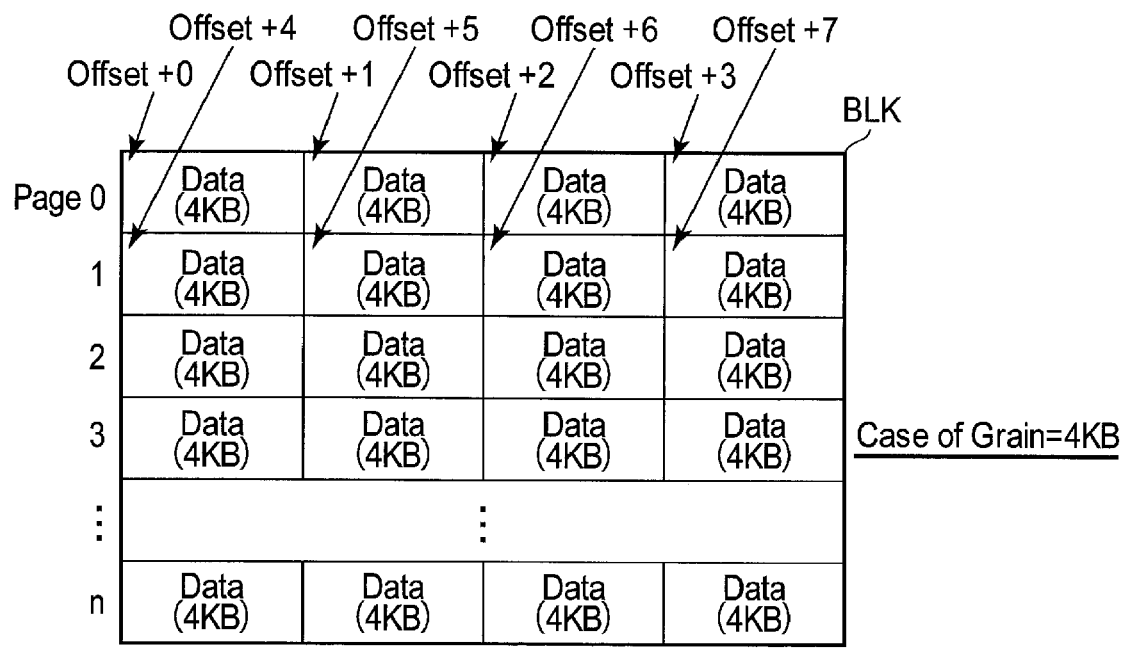
F I G. 12

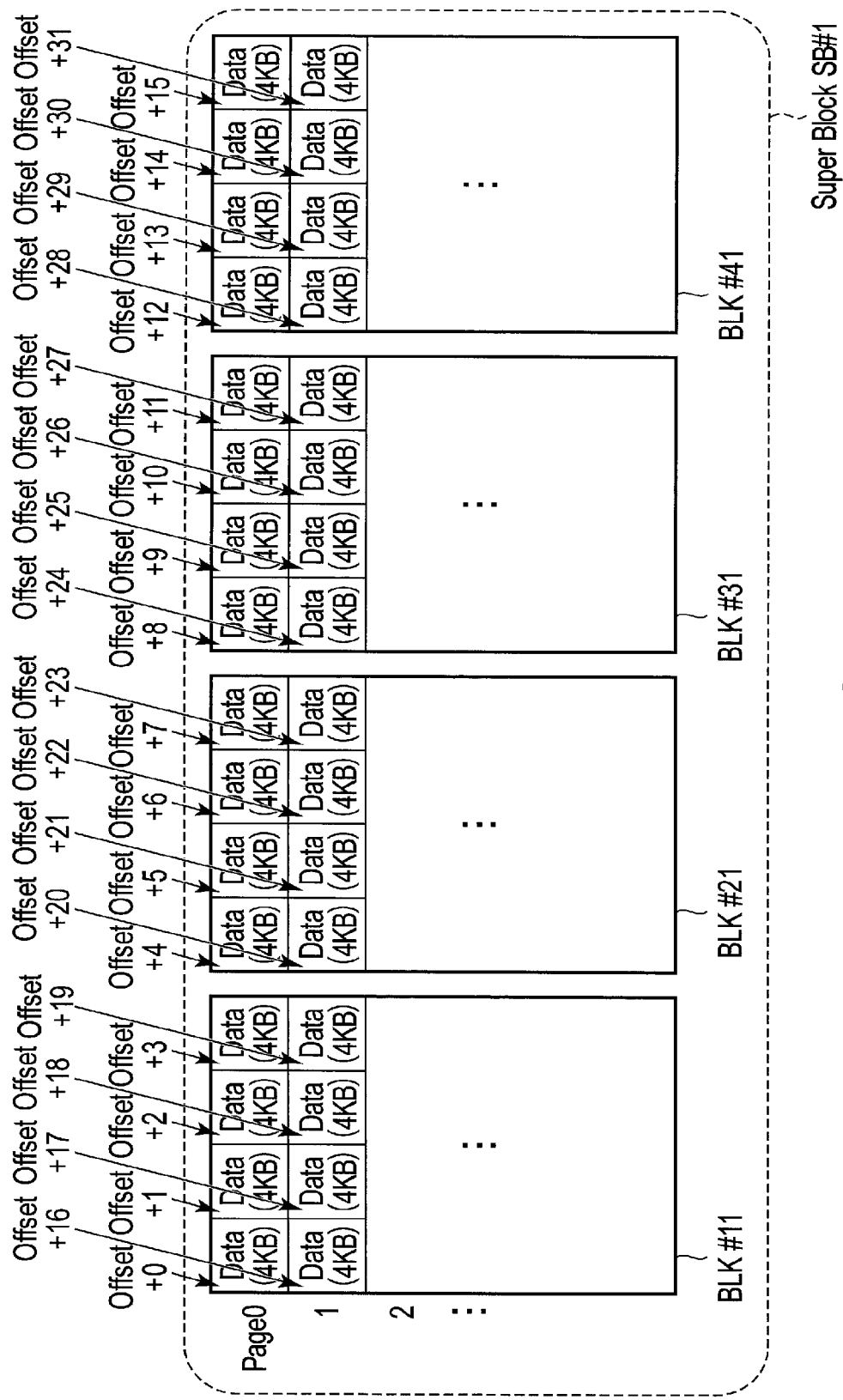
F I G. 13

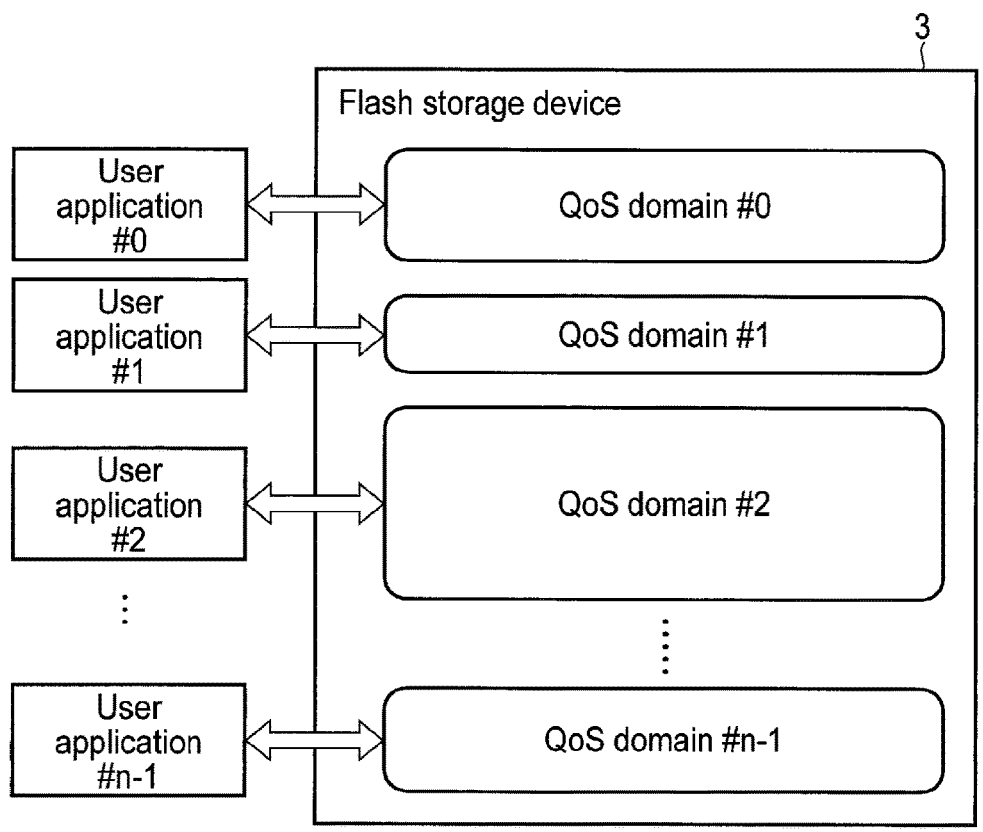
F I G. 14
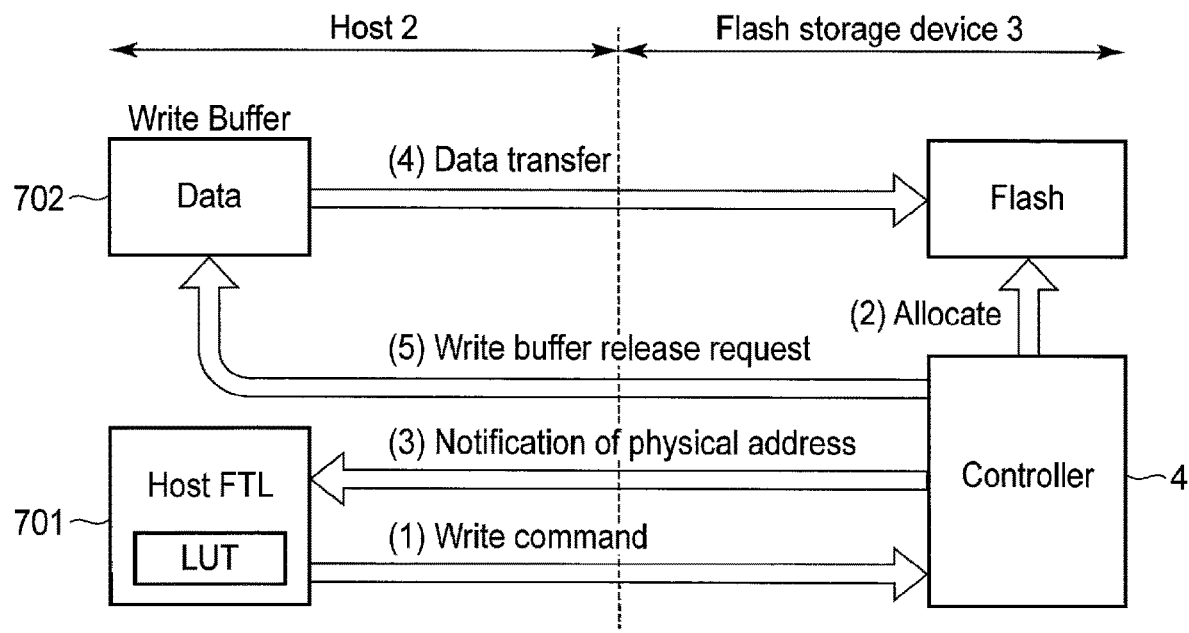
F I G. 15

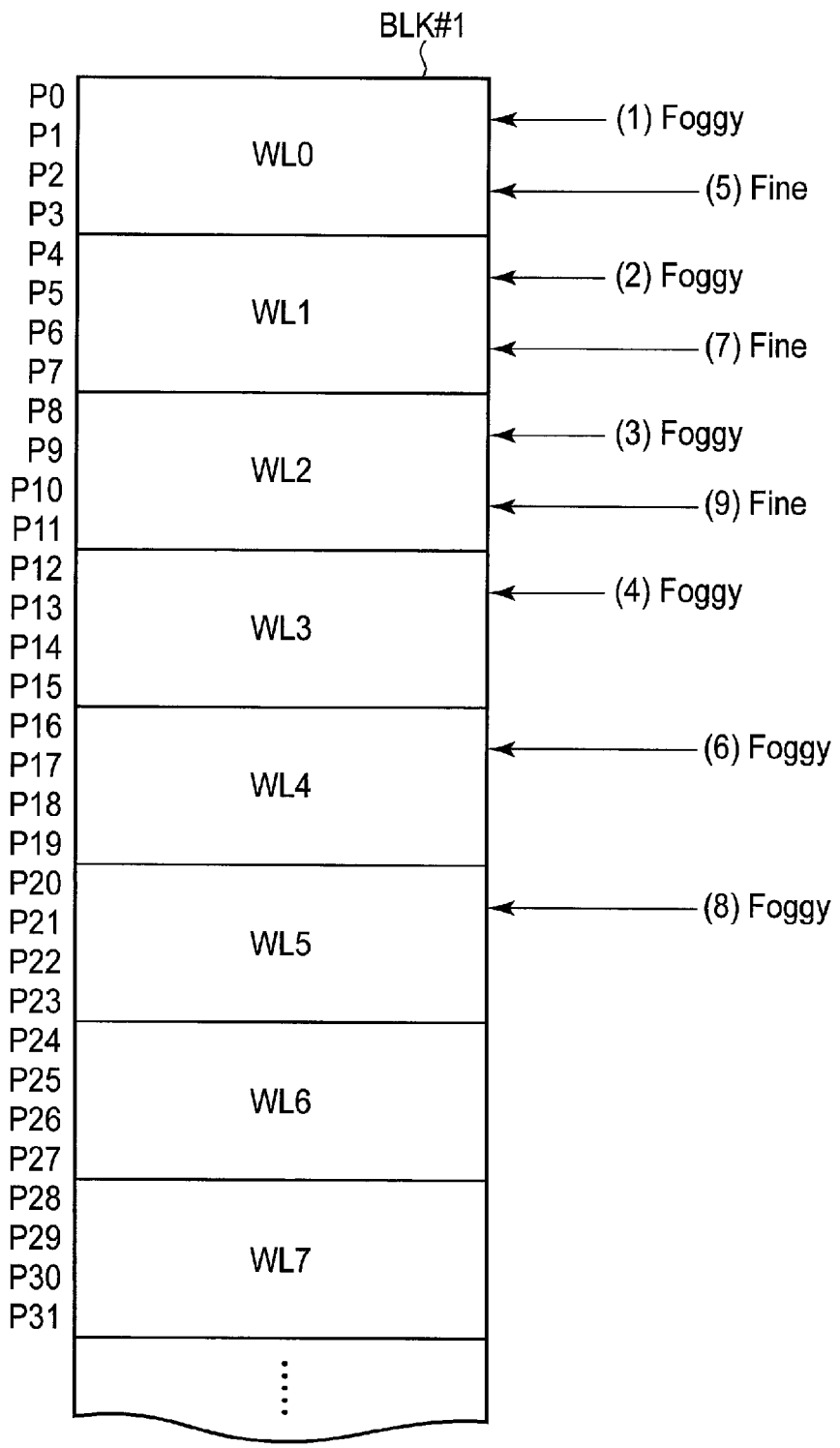
F I G. 16

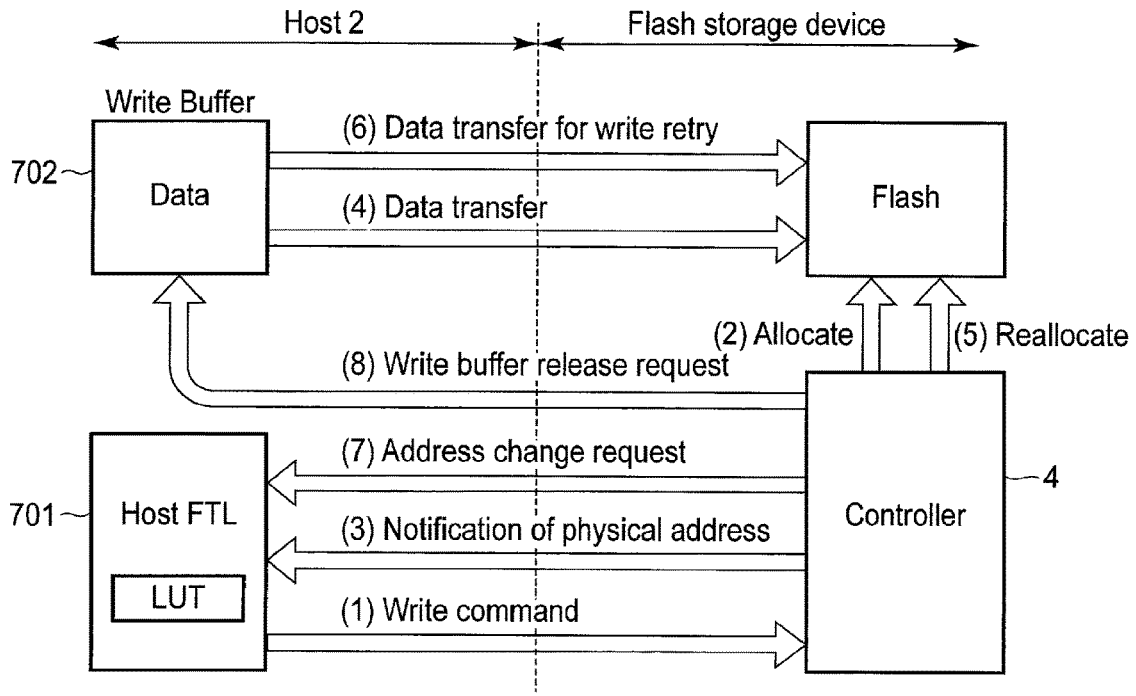
F I G. 17
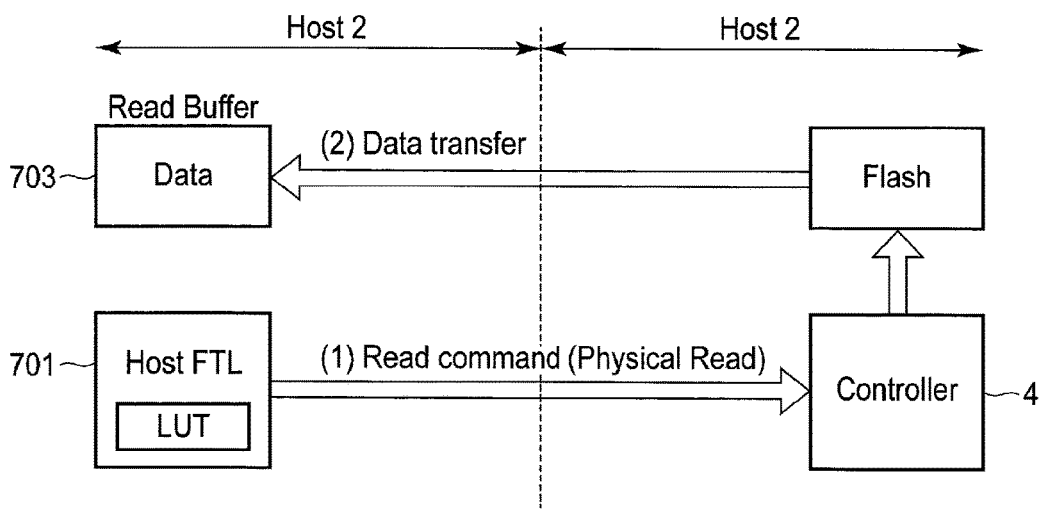
F I G. 18

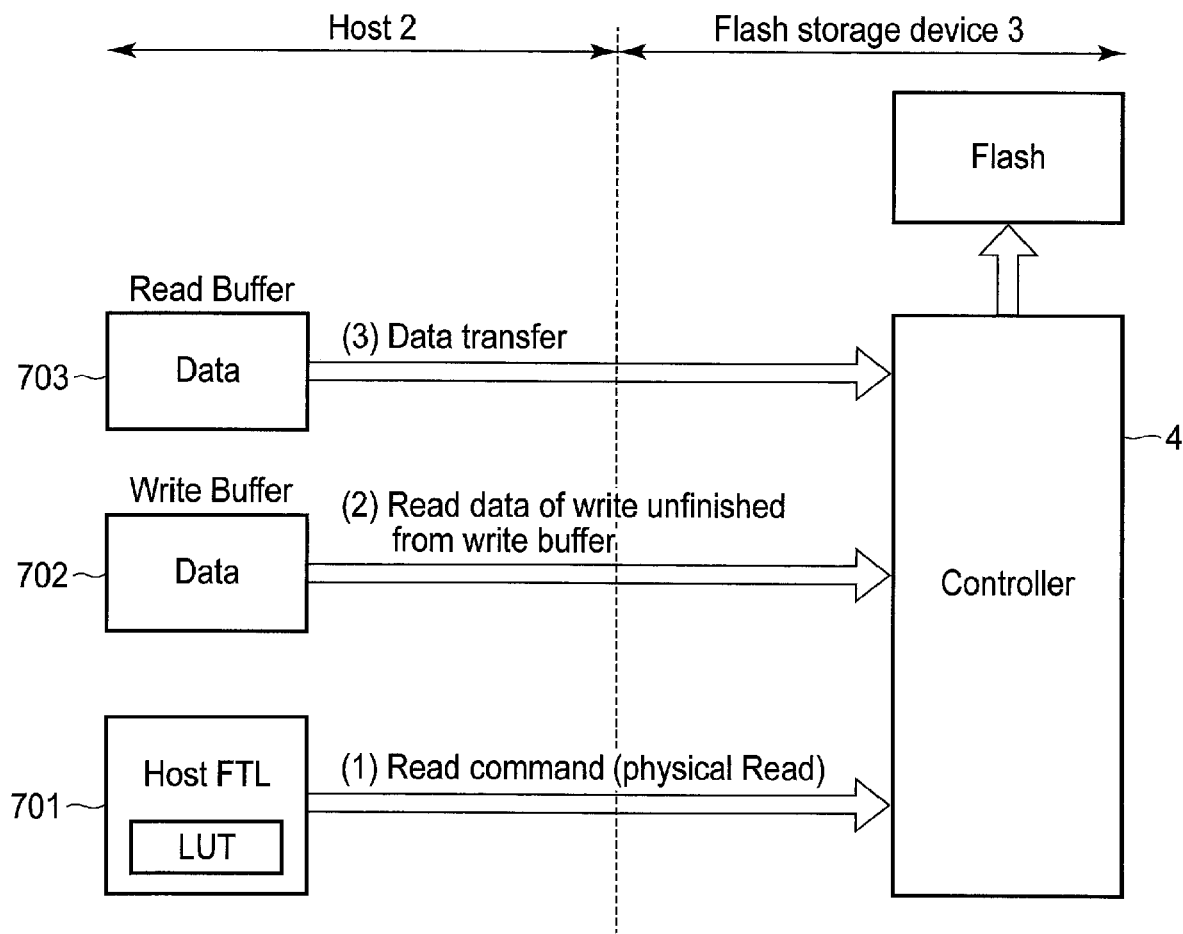
F I G. 19

_US 10,929,067 B2_

NONVOLATILE MEMORY SYSTEM AND METHOD FOR CONTROLLING WRITE AND READ OPERATIONS IN THE NONVOLATILE MEMORY BY A HOST

CROSS-REFERENCE TO RELATED APPLICATIONS

This application is based upon and claims the benefit of priority from Japanese Patent Application No. 2019-013220, filed Jan. 29, 2019, the entire contents of which are incorporated herein by reference.

FIELD

Embodiments described herein relate generally to technology of controlling a nonvolatile memory.

BACKGROUND

In recent years, memory systems comprising nonvolatile memories have been widely prevalent. As such a memory system, a solid state drive (SSD) based on a NAND flash technology is known.

In the server of a data center, an SSD is used as a storage device.

High I/O performance has been required for the storage device used in a host computing system such as a server.

For this reason, new technologies of enabling the host to directly control a nonvolatile memory in the storage device have been recently proposed.

However, if the host-side burden to control the nonvolatile memory in the storage device is increased, sufficient I/O performance may be unable to be obtained. For this reason, implementation of new technologies of reducing the host-side burden is required.

BRIEF DESCRIPTION OF THE DRAWINGS

FIG. 1 is a block diagram illustrating a relationship between a host and a memory system according to the embodiment.

FIG. 5 is a block diagram illustrating a configuration example of one block (super block) configured by a set of plural physical blocks.

FIG. 6 is a diagram illustrating the write command applied to the memory system of the embodiment.

FIG. 7 is a diagram illustrating an address record request sent to the host from the memory system of the embodiment.

FIG. 8 is a diagram illustrating a read command applied to the memory system of the embodiment.

FIG. 9 is a diagram illustrating a quality-of-service (QoS) domain create command applied to the memory system of the embodiment.

FIG. 10 is a diagram illustrating a write buffer release request sent to the host from the memory system of the embodiment.

FIG. 11 is a diagram illustrating an address change request sent to the host from the memory system of the embodiment.

FIG. 12 is a block diagram illustrating a block address and an offset defining a physical address included in each of an address record request and a read command.

FIG. 13 is a block diagram for explanation of a relationship between block numbers and offsets in a case where a super block is used.

FIG. 14 is a block diagram illustrating plural QoS domains managed by the memory system of the embodiment.

FIG. 15 is a block diagram illustrating data write processing executed by the host and the memory system of the embodiment.

FIG. 16 is a block diagram illustrating a write operation including plural write steps executed by the memory system of the embodiment.

FIG. 17 is a block diagram illustrating data write processing and write retry processing executed by the host and the memory system of the embodiment.

FIG. 18 is a block diagram illustrating data read processing executed by the host and the memory system of the embodiment.

FIG. 19 is a block diagram illustrating data read processing of reading the data from a write buffer of the host when the write operation of the data designated by the read command is not finished.

DETAILED DESCRIPTION

Figure 2:
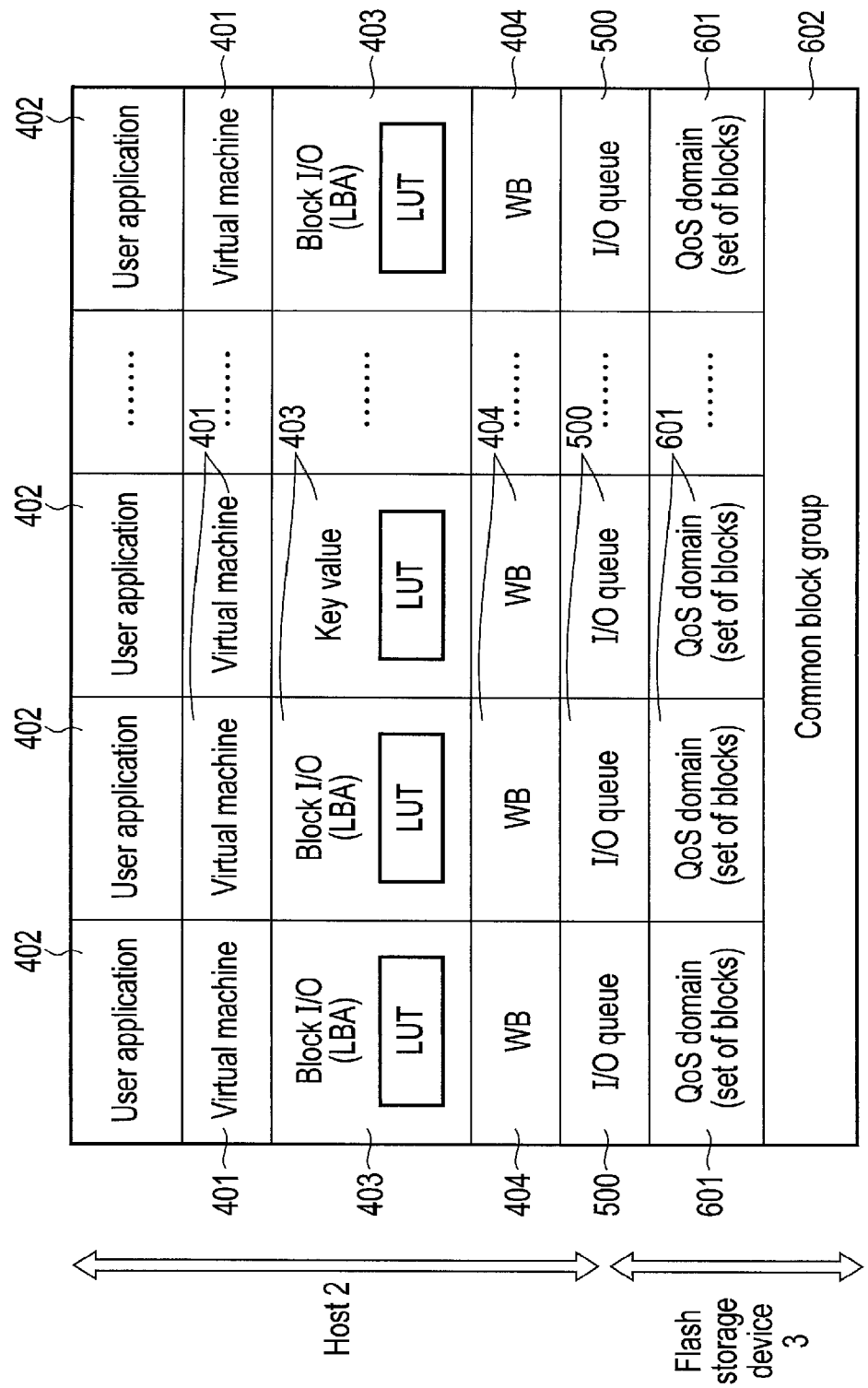
FIG. 2 is a diagram illustrating role sharing between a host and the memory system according to the embodiment.

Various embodiments will be described hereinafter with reference to the accompanying drawings.

In general, according to one embodiment, a memory system is connectable to a host. The memory system comprises a nonvolatile memory including a plurality of blocks, and a controller electrically connected to the nonvolatile memory and configured to control the nonvolatile memory. The controller receives from the host a write command to designate storage location information indicative of a storage location in a write buffer of the host where write data is stored. The controller determines a write destination block to which the write data is to be written, and a write destination location in the write destination block to which the write data is to be written. The controller notifies the host of an identifier of the write data, a block address of the write destination block, and an offset indicative of the write destination location in the write destination block. The controller retrieves the write data from the write buffer of the host on the basis of the storage location information, and writes the write data to the write destination location in the write destination block.

The controller receives from the host a read command to designate a physical address indicative of a storage location where first data to be read is stored. In a case where a write operation of the first data is already finished such that the first data is readable from the nonvolatile memory, the controller reads the first data from the nonvolatile memory. In a case where the read command is received before the write operation of the first data is finished such that the first data becomes readable, the controller reads the first data from the write buffer of the host.

First, a relationship between a host and a memory system according to an embodiment will be described with reference to FIG. 1.

The memory system is a semiconductor storage device configured to write data to a nonvolatile memory and to read data from the nonvolatile memory. The memory system is implemented as a flash storage device 3 based on the NAND flash technology.

The host (host device) 2 is configured to control plural flash storage devices 3. The host 2 is implemented by an information processing apparatus configured to use a flash array composed of plural flash storage devices 3 as a storage. This information processing apparatus may be a personal computer or a server computer.

The flash storage device 3 may be utilized as one of plural flash storage devices provided in the storage array. The storage array may be connected to the information processing device such as a server computer via a cable or a network. The storage array comprises a controller which controls plural storages (for example, plural flash storage devices 3) in the storage array. If the flash storage devices 3 are applied to the storage array, the controller of the storage array may function as the host of the flash storage devices 3.

An example of a case where the information processing apparatus such as a server computer functions as the host 2 will be described below.

The host (server) 2 and the flash storage devices 3 are interconnected via an interface 50 (internal interconnection). The interface 50 for interconnection is not limited to this, but, PCI Express (PCIe) (registered trademark), NVM Express (NVMe) (registered trademark), Ethernet (registered trademark) or NVMe over Fabrics (NVMeOF) and the like can be used as the interface.

A typical example of the server computer which functions as the host 2 is a server computer (hereinafter, referred to as a server) in a data center.

In a case where the host 2 is implemented by the server in the data center, the host (server) 2 may be connected to plural end user terminals (clients) 61 via a network 60. The host 2 can provide various services to the end user terminals 61.

Examples of the services which can be provided by the host (server) 2 are (1) Platform as a Service (PaaS) which provides a system running platform to each client (each end user terminal 61), (2) Infrastructure as a Service (IaaS) which provides an infrastructure such as a virtual server to each client (each end user terminal 61), and the like.

Plural virtual machines may be executed on a physical server which functions as the host (server) 2. Each of the virtual machines running on the host (server) 2 can function as a virtual server configured to provide various services to clients (end user terminals 61) corresponding to the virtual machines. An operating system and a user application, which are used by the end user terminal 61 corresponding to the virtual machine, are run in each of the virtual machines.

A flash translation layer (host FTL) is also executed in the host (server) 2. The host FTL includes a lookup table (LUT), which is an address translation table managing mapping between each of data identifiers (tags) to identify access target data and each of physical addresses of the nonvolatile memory in the flash storage device 3. The host FTL can recognize data placement on the nonvolatile memory in the flash storage device 3 by using the LUT.

The flash storage device 3 comprises a nonvolatile memory such as a NAND flash memory. The nonvolatile memory includes plural blocks each including plural pages. Each of the blocks is a unit of erasing the data, and each of the plural pages is a unit of data write and data read.

The flash storage device 3 can execute low-level abstraction. The low-level abstraction is a function for abstraction of the nonvolatile memory. The low-level abstraction includes a function of assisting the data placement and the like. The example of the function of assisting the data placement may include a function of allocating the write destination block to which the user data is to be written from the host 2, a function of determining the write destination location (write destination block and location in the write destination block) of the user data, a function of notifying an upper layer (host 2) of the write destination location (block address and offset) to which the user data is written, and the like.

The flash storage device 3 executes various commands received from the host 2. These commands include a write command to write the data to the nonvolatile memory in the flash storage device 3 and a read command to read the data from the nonvolatile memory. In the embodiments, each of the read commands designates a physical address indicative of the storage location in which the data to be read is stored. This physical address is indicated by a block address of a read target block and an offset (block offset) indicative of a read target storage location in the read target block.

The flash storage device 3 receives from the host 2 read commands each designating the block address of the read target block and the offset indicative of the read target storage location in the read target block and executes the data read operation in response to each of the received read commands.

FIG. 2 illustrates role sharing between the host 2 and the flash storage device 3.

In the host (server) 2, plural virtual machines 401 corresponding to plural end users, respectively, are executed. An operating system and a user application 402, which are used by the corresponding end user, are executed in each of the virtual machines 401.

In addition, plural I/O services 403 corresponding to plural user applications 402, respectively, are executed in the host (server) 2. The I/O services 403 may include logical block address (LBA)-based block I/O service, key-value store service, and the like. Each of the I/O services 403 includes a lookup table (LUT) which manages mapping between each of the tags and each of the physical addresses of the flash storage device 3.

The tag is indicative of an identifier which can identify access target data. A typical example of the tag is not limited to this but is a logical address such as LBA. Alternatively, a key of a key-value store, a hash value of this key, or the like may be used as the tag.

The physical address of the flash storage device 3 is an address for identifying a storage location (physical storage location) in the nonvolatile memory incorporated in the flash storage device 3.

In the LBA-based block I/O service, LUT which manages mapping between each of the logical addresses (LBAs) and each of the physical addresses of the flash storage device 3 may be used.

In contrast, in the key-value store service, LUT which manages mapping among each of keys (hash values of the keys), each of the physical addresses of the flash storage devices 3 storing the data corresponding to these keys, and each of data lengths of the data corresponding to the keys, may be used.

Each of the end users can select an addressing method (LBA, the key of the key-value store, the hash value of the key, or the like) to be used.

In the host (server) 2, plural write buffers (WB) 404 corresponding to the plural virtual machines 401, respectively, may be managed. Write data from a certain user application 402 may be temporarily stored in the write buffer (WB) 404 for the virtual machine 401 corresponding to the user application 402.

Transmission of the command from the host (server) 2 to the flash storage device 3 and return of a response of command completion or the like from the flash storage device 3 to the host (server) 2 are executed via an I/O queue 500 which exists in each of the host (server) 2 and the flash storage devices 3.

The flash storage device 3 manages each of plural regions obtained by logically dividing the nonvolatile memory in the flash storage device 3, as QoS domain 601. Each of the QoS domains 601 is a subset of the plural blocks included in the nonvolatile memory. Each of the plural blocks included in the nonvolatile memory belongs to only one QoS domain 601 but the same block does not simultaneously belong to different QoS domains 601.

The QoS domains 601 are identified by identifiers called QoS domain IDs, respectively. The QoS domain IDs are used as plural identifiers for access to the plural regions (plural QoS domains), respectively.

In the embodiment, each write command designates storage location information indicative of a storage location in the write buffer (WB) 404 of the host 2 where data to be written is stored. In addition, each write command can designate an identifier (QoS domain ID) of the region (QoS domain) to which the data is to be written. When the flash storage device 3 receives a write command designating a certain QoS domain ID from the host 2, the flash storage device 3 selects one block of the common block group 602 shared by the plural QoS domains 601 and allocates the selected block as a write destination block for the QoS domain having the QoS domain ID.

The write destination block is indicative of the block to which the data is to be written. The common block group 602 is a common block group including a set of free blocks shared by the plural QoS domains 601.

The free block is indicative of a block in a state (free state) of being capable of being reused (reallocated) as a new write destination block. A typical example of the free block is a block where no valid data is stored. The valid data is indicative of the latest data associated with a tag such as LBA. In other words, the data linked to LUT of the host as the latest data is the valid data. In addition, invalid data is indicative of the data which is not associated with the tag such as LBA. The data which is not linked to LUT of the host 2 is the invalid data. For example, if updated data corresponding to certain LBA is written to the flash storage device 3, previous data corresponding to the LBA becomes invalid data.

The flash storage device 3 retrieves data associated with the received write command from the write buffer (WB) 404 of the host 2 and writes the data to the write destination block allocated to the QoS domain. If a usable write destination block is already allocated for this QoS domain, the above-described operation of allocating one block (free block) of the blocks of the common block group 602 as the write destination block for the QoS domain does not need to be executed. The flash storage device 3 writes the data associated with the received write command to a next usable page in the already allocated write destination block.

When the data associated with the received write command is written to the write destination block, the flash storage device 3 sends to the host 2 a tag of this data and a physical address (block address and offset) indicative of the storage location in the nonvolatile memory to which the data is written as an address record request. The block address is an identifier for identifying the write destination block. Since the nonvolatile memory is generally composed of plural nonvolatile memory chips, a block address of a certain block may be indicated by a chip number of the nonvolatile memory and a block number in the chip. The offset is indicative of a storage location in the write destination block.

The host 2 can update LUT such that the physical address (block address and offset) is associated with the tag of the data, in response to the address record request.

As regards each of the blocks included in each QoS domain, the host 2 can determine whether data stored in each block is valid data or invalid data by using the LUT. In addition, the host 2 can transmit a command (reuse command) to transition a block to which the data is already written to a reusable state (free block) of being reusable as a new write destination block, to the flash storage device 3.

Figure 3:
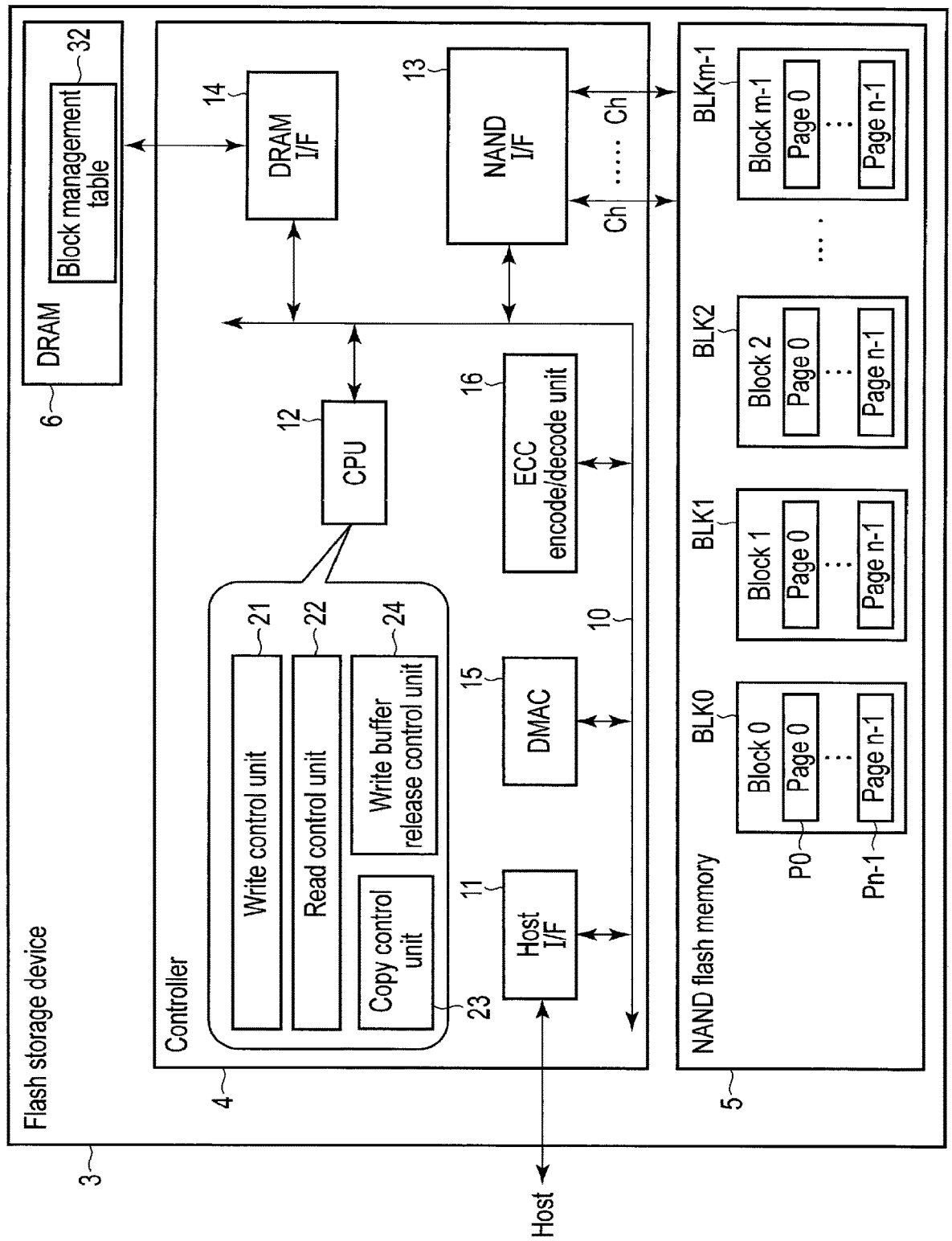
FIG. 3 is a block diagram illustrating a configuration example of the memory system of the embodiment.

FIG. 3 shows a configuration example of the flash storage device 3.

The flash storage device 3 comprises a controller 4 and a nonvolatile memory (NAND flash memory) 5. The flash storage device 3 may comprise a random access memory, for example, a DRAM 6.

The NAND flash memory 5 comprises a memory cell array comprising plural memory cells arranged in a matrix. The NAND flash memory 5 may be a NAND flash memory having a two-dimensional structure or a NAND flash memory having a three-dimensional structure.

The memory cell array of the NAND flash memory 5 includes plural blocks BLK0 to BLKm−1. Each of the blocks BLK0 to BLKm−1 includes plural pages (pages P0 to Pn−1 in this case). Blocks BLK 0 to BLK m−1 function as erase units. Blocks may be called erase blocks, physical blocks or physical erase blocks. The pages P0 to Pn−1 are units for a data write operation and a data read operation.

The controller 4 is electrically connected to the NAND flash memory 5 which is a nonvolatile memory via a NAND interface 13 such as Toggle NAND flash interface or Open NAND Flash Interface (ONFI). The controller 4 operates as a memory controller configured to control the NAND flash memory 5. The controller 4 may be realized by a circuit such as a System-on-a-chip (SoC).

Figure 4:
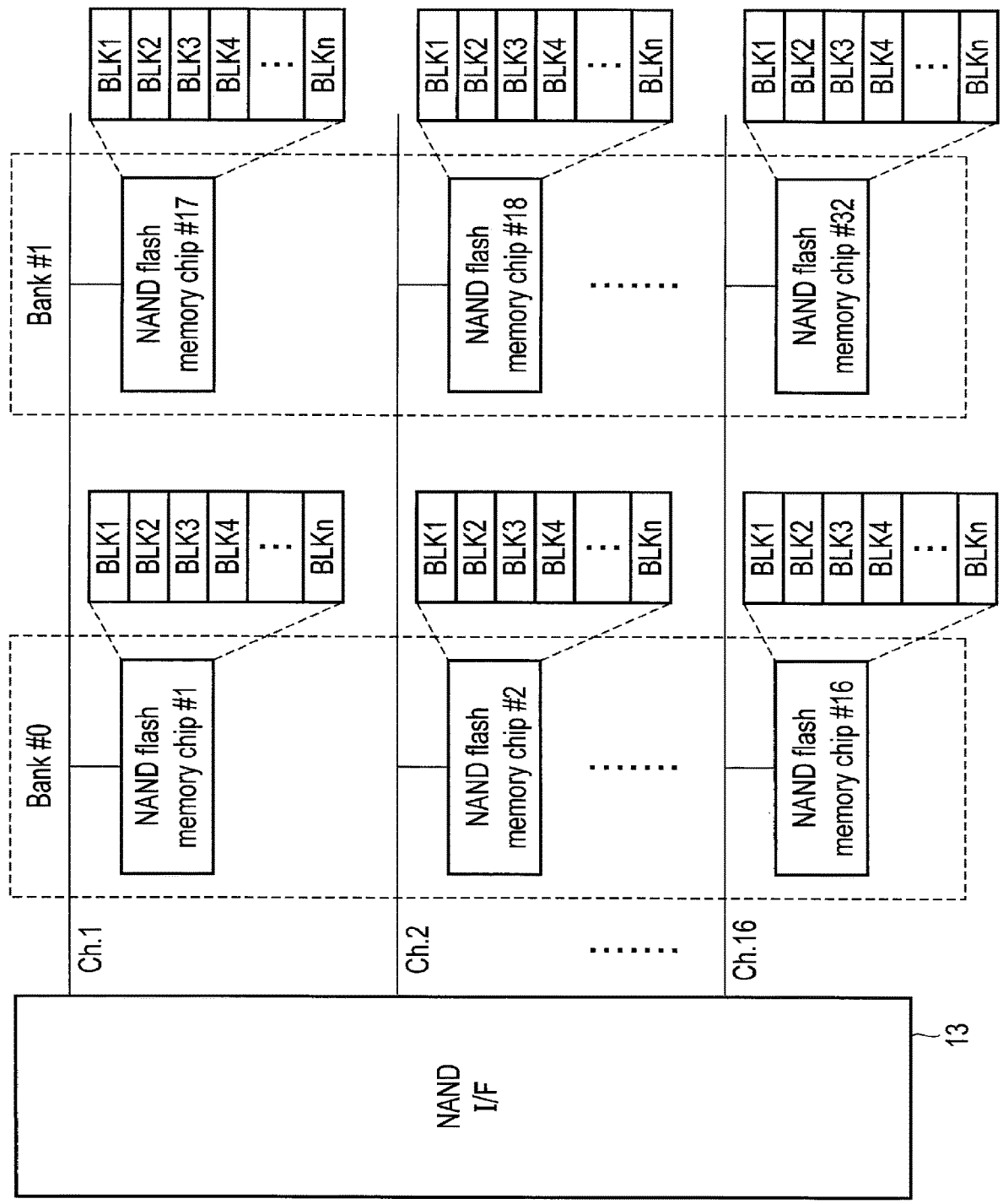
FIG. 4 is a block diagram showing a relationship between a NAND interface and plural NAND flash memory chips, which are provided in the memory system of the embodiment.

As illustrated in FIG. 4, the NAND flash memory 5 may include plural NAND flash memory chips (NAND flash memory dies). Each of the NAND flash memory chips can operate independently. For this reason, the NAND flash memory chips function as parallel operation units. FIG. 4 illustrates an example of a case where sixteen channels Ch. 1 to Ch. 16 are connected to the NAND interface 13, and two NAND flash memory chips are connected to each of sixteen channels Ch. 1 to Ch. 16. In this case, sixteen NAND flash memory chips #1 to #16 connected to channels Ch. 1 to Ch. 16 may be organized as bank #0, and remaining sixteen NAND flash memory chips #17 to #32 connected to channels Ch. 1 to Ch. 16 may be organized as bank #1. The banks function as parallel operation units for operating plural memory modules in parallel by bank interleaving. In the configuration example of FIG. 4, a maximum of thirty-two NAND flash memory chips can be urged to execute the parallel operation by sixteen channels and bank interleaving using two banks.

An erase operation may be executed in units of single block (physical block) or units of block group (super block) including a set of plural physical blocks capable of parallel operation. Each block group (one super block) is not limited to this but may include thirty-two physical blocks selected one by one from respective NAND flash memory chips #1 to #32. Each of NAND flash memory chips #1 to #32 may comprise a multiplane structure. For example, when each of NAND flash memory chips #1 to #32 comprises a multiplane structure including two planes, each super block may include sixty-four physical blocks in total selected one by one from sixty-four planes corresponding to NAND flash memory chips #1 to #32.

FIG. 5 illustrates an example of a super block (SB) including thirty-two physical blocks (i.e., physical block BLK2 in NAND flash memory chip #1, physical block BLK3 in NAND flash memory chip #2, physical block BLK7 in NAND flash memory chip #3, physical block BLK4 in NAND flash memory chip #4, physical block BLK6 in NAND flash memory chip #5, . . . , physical block BLK3 in NAND flash memory chip #32).

The write destination block may be either a single physical block or a single super block. Each super block may include only one physical block and, in this case, a single super block is equivalent to a single physical block.

Next, the configuration of the controller 4 of FIG. 3 will be described.

The controller 4 includes a host interface 11, CPU 12, a NAND interface 13, a DRAM interface 14, a direct memory access controller (DMAC) 15, an ECC encode/decode unit 16, and the like. The host interface 11, the CPU 12, the NAND interface 13, the DRAM interface 14, the DMAC 15, and the ECC encode/decode unit 16 are interconnected via the bus 10.

The host interface 11 is a host interface circuit configured to execute communication with the host 2. The host interface 11 may be, for example, a PCIe controller (NVMe controller). Alternatively, when the flash storage device 3 is connected to the host 2 via Ethernet (registered trademark), the host interface 11 may be an NVMe over Fabrics (NVMeOF) controller.

The host interface 11 receives various commands from the host 2. The commands include a write command, a read command, a copy command, an erase command, a reuse command, a QoS domain create command, and other various commands.

The CPU 12 is a processor configured to control the host interface 11, the NAND interface 13, the DRAM interface 14, the DMAC 15, and the ECC encode/decode unit 16. The CPU 12 loads a control program (firmware) from the NAND flash memory 5 or a ROM (not illustrated) to the DRAM 6 in response to power-on of the flash storage device 3 and executes various processing by executing the firmware. The firmware may be loaded into a SRAM in the controller 4, which is not illustrated in the drawings. The CPU 12 can execute command processing for executing various commands transmitted from the host 2, and the like. The operations of the CPU 12 can be controlled by the above-described firmware executed by the CPU 12. Several or all parts of the command processing may be executed by dedicated hardware in the controller 4.

The CPU 12 can function as a write control unit 21, a read control unit 22, a copy control unit 23, and a write buffer release control unit 24. Several or all parts of each of the write control unit 21, the read control unit 22, the copy control unit 23, and the write buffer release control unit 24 may also be implemented by dedicated hardware in the controller 4.

The write control unit 21 receives from the host 2 a write command designating the storage location information indicative of the storage location in write buffer of the host 2 where the write data is stored. The write control unit 21 determines a write destination block to which the data is to be written and a write destination location in the write destination block to which the data is to be written. Before starting the operation of writing the write data, the write control unit 21 notifies the host 2 of an identifier (tag) of the write data, a block address of the determined write destination block, and an offset indicative of the determined write destination location in the write destination block.

The write destination block to which the write data is to be written may be a single physical block or a single super block. In a case of using one physical block as a write destination block, the block address is a block address for identifying the physical block. This block address may be indicated by a chip number and a block number in the chip. In a case of using one super block as a write destination block, the block address is a block address (also called a super block address) for identifying the super block. Different super block addresses may be given to all the super blocks in the flash storage device 3.

The offset is indicative of an offset from the beginning of the write destination block to the write destination location, i.e., an offset of the write destination location with respect to the beginning of the write destination block. The size of the offset from the beginning of the write destination block to the write destination location may be represented by a multiple of the grain having a certain size. Alternatively, the offset may be represented by a page address of a page and a page offset in this page.

The write control unit 21 retrieves the write data from the write buffer of the host 2, based on the storage location information. The write control unit 21 executes a write operation of writing the write data to the determined write destination location in the determined write destination block.

In the embodiments, a write command of the type which designates the QoS domain ID and the tag but does not designate the physical address may be used as the write command.

In this case, the write control unit 21 receives from the host 2 a write command designating the storage location information in the write buffer, the QoS domain ID and the tag. The tag is an identifier capable of identifying data (user data) to be written and may be, for example, LBA, a key of a key-value store, or a hash value of this key. When the write control unit, 21 receives the write command, the write control unit 21 selects one of blocks of the common block group 602, and allocates the selected block as a write destination block for the QoS domain corresponding to the QoS domain ID designated by the write command. The write destination block allocated for the QoS domain is determined as the write destination block to which the write data is to be written. The block allocated as the write destination block for the QoS domain may be a physical block or a super block.

The write control unit 21 may select a block (a physical block or a super block) having the minimum program/erase cycle count. Wear leveling can be thereby executed between the QoS domains. If a usable write destination block is already allocated for this QoS domain, the operation of allocating one of the blocks of the common block group 602 as the write destination block for the QoS domain is not executed. The already allocated write destination block is determined as the write destination block to which the write data is to be written.

The write control unit 21 determines a location in the write destination block (i.e., a write destination location) to which the write data is to be written, by considering restrictions on page write order, defective pages in the write destination block, and the like. Next, the write control unit 21 retrieves the data (write data) from the write buffer of the host 2 based on the storage location information, and writes the write data to the write destination location of the write destination block. In this case, the write control unit 21 can write not only the write data transmitted from the host 2, but also both of the write data and the tag of the write data to the write destination block.

When a whole write destination block of a certain QoS domain is filled with the data, the write control unit 21 allocates one of the blocks of the common block group 602 as a new write destination block for this QoS domain. For example, if an entire portion of a current write destination block is filled with data by write of a part of the write data associated with a certain write command, the write control unit 21 allocates one of the blocks of the common block group 602 as a new write destination block for this QoS domain and writes the remaining part of the write data associated with the write command to the new write destination block.

The read control unit 22 receives from the host 2 the read command designating the physical address indicative of the storage location where the data to be read is stored. If the operation of writing the data has been already finished and thereby the data can be read from the NAND flash memory 5, the read control unit 22 reads the data from the NAND flash memory 5 and returns the read data to the host 2.

In contrast, if the read command is received before the operation of writing the data is finished such that the data becomes readable, i.e., if the data is not readable from the NAND flash memory 5, the read control unit 22 reads the data from the write buffer of the host 2 and returns the read data to the host 2.

Thus, in the embodiments, in a case where a read command designating write data (several or all parts of write data) is received from the host 2 as the read target data before the operation of writing the write data is finished such that the write data can be read from the NAND flash memory 5, the read control unit 22 executes the read operation including an operation of reading the read target data from the write buffer of the host 2 and an operation of returning the read data to the host 2. Thus, in a case where the operation of writing the data designated as the read target data by the read command is not finished and the data cannot be read from the NAND flash memory 5, the read control unit 22 does not return a read error to the host 2 but reads the data from the write buffer of the host 2 and returns the data to the host 2.

Therefore, the host 2 can receive the data from the flash storage device 3 by merely transmitting the read command to designate the physical address corresponding to the data to be read to the flash storage device 3, without executing complicated processing of determining whether each of write data is readable from the NAND flash memory 5 or not. The host 2 is notified of the physical address of each of the write data from the flash storage device 3 before the write data are actually written to the NAND flash memory 5. Thus, since the host 2 can recognize the physical address of each of the write data at early timing, the host 2 can efficiently create the read command designating the physical address indicative of the storage location where the data to be read is stored.

In a number of present-day NAND flash memories, a complicated write operation is often executed to reduce program disturb. For this reason, in a number of flash memories of the present-day NAND flash memories, even if the data is written to a certain page in a block, the data written to this page often cannot be read immediately after the write, but the data read from this page can be executed after data write to one or more pages subsequent with this page.

In the NAND flash memory, miniaturization of cells has proceeded, and program disturb that a threshold level of adjacent cells is varied by data write to the cells may occur. For this reason, in the NAND flash memory, a program operation that data write to each cell in a certain page allows the threshold level of each cell in one or more pages immediately before the page to be corrected may be executed in consideration of an influence of the program disturb. If the data is read from the page before the correction is completed, error data different from the original data is read. The timing of completing the correction is different according to the type of the NAND flash memory.

In addition, in the present-day NAND flash memory, the data write operation is often executed by plural write steps including transferring the same write data to the NAND flash memory at plural times. One of examples of the data write operation including plural write steps is a foggy fine write operation.

The data write operation including plural write steps composed of at least a first-stage write operation such as the foggy write operation and a second-stage write operation such as the fine write operation. The foggy write operation is a write operation of roughly setting a threshold distribution of each memory cell, while the fine write operation is a write operation of adjusting the threshold distribution of each memory cell. Furthermore, an intermediate write operation may be executed between the foggy write operation and the fine write operation.

In addition, in the present-day NAND flash memories, the data write operation is executed in several adjacent word lines back and forth. For example, a program sequence of (1) the foggy write operation for a memory cell group connected to the first word line, (2) the foggy write operation for a memory cell group connected to the second word line, (3) the fine write operation for a memory cell group connected to the first word line, (4) the foggy write operation for a memory cell group connected to the third word line, (5) the fine write operation for a memory cell group connected to the second word line, . . . is applied to the foggy-fine write operation executed in two word lines back and forth.

Therefore, much time is required from start to end of the write operation of writing certain data.

In the embodiments, in a case where a read command designating write data is received from the host 2 before the operation of writing the write data is finished (for example, both the foggy write operation and the fine write operation are finished) such that the write data becomes readable, the read control unit 22 reads the read target data from the write buffer of the host 2 and returns the read data to the host 2. Therefore, the host 2 can receive desired data from the flash storage device 3 by merely executing simple processing of issuing the read command to the flash storage device 3 without executing the processing of checking whether the data to be read can be read from the NAND flash memory 5 or not and the processing of selectively issuing the read request to the write buffer and the read command to the flash storage device 3.

In response to the copy command received from the host 2, the copy control unit 23 copies data in a certain block allocated for a certain QoS domain to a block (copy destination block) for this QoS domain or the other QoS domain. The copy destination block is a write destination block to which the data already written in the nonvolatile memory is to be written (copied). This copy command may designate a QoS domain ID of the copy source QoS domain, a block address of the copy source block, and a QoS domain ID of the copy destination QoS domain. The copy source block may be a physical block or a super block.

In addition, the host 2 can transmit management data (map data) indicative of whether the data in the copy source block is valid data or invalid data, in units of a predetermined management size (for example, 4 KB), to the flash storage device 3. This map data may be included in the copy command or may be transmitted from the host 2 to the flash storage device 3 apart from the copy command 3. On the basis of the map data and the copy command which are received from the host 2, the copy control unit 23 can copy valid data in the copy source block to a block (copy destination block) for this QoS domain or the other QoS domain.

When copying the data (valid data) from the copy source block to the copy destination block is completed, the copy control unit 23 notifies the host 2 of a tag of the data and a copy destination physical address (block address and offset) of the data for each element of the copied data.

After the operation of writing the write data is finished such that the write data becomes readable from the NAND flash memory 5, the write buffer release control unit 24 transmits to the host 2 a release request to release the region in the write buffer of the host 2 where the write data is stored. The burden on the host 2 for management of the write buffer can be therefore reduced.

The NAND interface 13 is a memory control circuit configured to control the NAND flash memory 5 under the control of the CPU 12.

The DRAM interface 14 is a DRAM control circuit configured to control the DRAM 6 under the control of the CPU 12. A storage region in the DRAM 6 is utilized to store the block management table 32. In addition, the storage region of the DRAM 6 can also be used as an internal buffer for temporarily storing the write data and the like. A buffer-less configuration that an internal buffer is not provided in the flash storage device 3 or the capacity of the internal buffer is approximately close to zero may be applied to the flash storage device 3.

The block management table 32 includes plural management tables corresponding to plural blocks in the NAND flash memory 5, respectively. Each of the management tables is used to store management information (metadata) for managing a block corresponding to the management table. The metadata is not limited to this, but may include a rewrite count (number of program/erase cycles), an open/close state, a write destination page range, and the like. The open/close state is indicative of an open state or close state of this block. The open state is indicative of a state where this block is being used as a write destination block. The write destination block implies a write destination block for host write to which the data is written from the host 2 and a write destination block for copying the data already written in the nonvolatile memory. The write destination block for data copy is also called a copy destination block.

The close state is indicative of a state where the block is filled with the data and managed as an active block. The write destination page range is indicative of a range of pages on which the write (program) operation is currently executed.

DMAC 15 executes data transfer between the memory (write buffer) in the host 2 and DRAM 6 (internal buffer) under control of the CPU 12. When the write data needs to be transferred from the write buffer of the host 2 to the internal buffer, the CPU 12 designates a transfer source address indicative of a location on the write buffer, data size, and a transfer destination address indicative of a location on the internal buffer to the DMAC 15.

When the data is to be written to the NAND flash memory 5, the ECC encode/decode unit 16 encodes (ECC-encodes) the write data to be written and thereby adds an error-correcting code (ECC) to the data. When the data is read from the NAND flash memory 5, the ECC encode/decode unit 16 executes error correction of this data by using ECC added to the read data.

FIG. 6 illustrates a write command applied to the flash storage device 3.

The write command is a command to request the flash storage device 3 to write the data. The write command may include command ID, QoS domain ID, the tag, the length, the write buffer address, and the like.

The command ID is an identifier unique to this command (i.e., this write command). The QoS domain ID is an identifier capable of uniquely identifying the QoS domain to which the data should be written. A write command transmitted from the host 2 in response to a write request from an application corresponding to a certain end user includes the QoS domain ID designating the QoS domain corresponding to this end user.

The tag is an identifier for identifying write data to be written. The tag may be a logical address such as LBA, a key of a key-value store or a hash value of this key, as described above.

The length is indicative of the length of the write data to be written. The length (data length) may be designated by the number of the above-described granularity (also referred to as Grain), designated by the number of LBA, or designated by bytes.

The write buffer address is the storage location information indicative of a storage location in the host memory (write buffer of the host 2) where the write data to be written is stored. The write buffer address is also referred to as a data pointer.

The controller 4 can create the QoS domain having a capacity designated by the QoS domain create command, based on the QoS domain create command received from the host 2. In this case, the controller 4 may secure (reserve) the number of blocks corresponding to the designated capacity, of the common block group 602 shown in FIG. 2, for this QoS domain. Every time the host 2 transmits the QoS domain create command a new QoS domain is created.

The controller 4 can manage not only the common block group 602, but also the active block list (active block pool) corresponding to each of the QoS domains.

The state of each block is roughly classified into an active block (block in a closed state) where valid data is stored, and a free block where valid data is not stored and which can be reused as a write destination block. At a certain QoS domain, each of the blocks which are the active blocks is managed by an active block list corresponding to this QoS domain. In contrast, the free block of each QoS domain is managed by the common block group 602.

When the controller 4 receives a write command to designate a certain QoS domain ID from the host 2, the controller 4 selects one of blocks (free blocks) in the common block group 602 and allocates the selected block to this QoS domain as a write destination block. Furthermore, the controller 4 determines the location (write destination location) in the write destination block. The write destination location in the write destination block is determined in consideration of the restrictions on page write order, the bad pages, and the like. Then, the controller 4 writes the data transmitted from the host 2 to the write destination location in the write destination block.

If the whole write destination block is filled with the user data, the controller 4 moves the write destination block to the active block list (active block pool) of this QoS domain. The controller 4 block group 602 and allocates the selected block to this QoS domain as a new write destination block.

An upper limit of the number of blocks that can be allocated to a certain QoS domain is limited to the number of blocks corresponding to the capacity of this QoS domain. If one of the blocks of the common block group 602 is allocated to this QoS domain, the controller 4 decrements the current number of blocks that can be allocated to this QoS domain by 1. If this block is returned to the common block group 602 by the reuse command or the erase command designating one of the blocks of this QoS domain, the controller 4 increments the current number of blocks that can be allocated to this QoS domain by 1.

FIG. 7 illustrates an address record request transmitted from the flash storage device 3 to the host 2.

The address record request is used to notify the host 2 of the physical address indicative of the storage location (physical storage location) in the NAND flash memory 5 where the write data associated with the write command is written. The address record request may include QoS domain ID, the tag, the physical address, and the length.

The QoS domain ID is an identifier for identifying the QoS domain to which the write data is written. The tag is the tag included in the write command illustrated in FIG. 6. The physical address is indicative of a physical storage location where the write data associated with the write command is written. The physical address is represented by the block address and the offset. The length is indicative of the length of the written write data.

On the basis of the address record request received from the flash storage device 3, the host 2 can update LUT corresponding to this QoS domain such that the physical address (block address and offset) indicative of the storage location where the write data is written is associated with a tag (for example, LBA) of the write data. In addition, the host 2 can manage validity/invalidity management information for each block used in the QoS domain, based on the content of LUT corresponding to each QoS domain. The validity/invalidity management information corresponding to a certain block indicates whether each of the data stored in this block is valid data or invalid data.

FIG. 8 illustrates a read command applied to the flash storage device 3.

The read command is a command to request the flash storage device 3 to read the data. The read command may include the command ID, the QoS domain ID, the physical address, the length, and the read buffer address.

The command ID is an identifier unique to this command (i.e., this read command). The QoS domain ID is an identifier for identifying the QoS domain to which the data to be read is stored. The physical address is indicative of a physical storage location to which the data to be read is stored. The physical address is represented by the block address and the offset. This block address is a block address of the read target block. The offset is indicative of a read target storage location in the read target block. The length is indicative of the length of the data to be read. The read buffer address is indicative of a location in the host memory (read buffer of the host 2) to which the read data is to be transferred.

FIG. 9 illustrates a QoS domain create command.

The QoS domain create command is a command for creating the QoS domain. The QoS domain create command may include a command ID, a QoS domain ID, and a capacity.

The command ID is an identifier unique to this command (i.e., this QoS domain create command). The QoS domain ID is an identifier of a QoS domain to be created. The capacity is indicative of a capacity which is to be secured for the QoS domain to be created. The controller 4 secures the number of blocks corresponding to this capacity from the common block group 602, and allocates one of the secured blocks as the write destination block for this QoS domain in response to the write command designating this QoS domain ID.

FIG. 10 illustrates a write buffer release request transmitted from the flash storage device 3 to the host 2.

The write buffer release request is used to release a region in the write buffer where data which becomes readable from the NAND flash memory 5 by finishing the write to the NAND flash memory 5 is stored. The write buffer release request may include a write command ID. The write command ID is an identifier of the write command corresponding to releasable write data. For example, when writing the write data associated with a certain write command is finished, the controller 4 of the flash storage device 3 may transmit to the host 2 the write buffer release request including the identifier (command ID) of this write command. Alternatively, the write buffer release request may include storage location information indicative of a releasable region in the write buffer.

FIG. 11 illustrates an address change request transmitted from the flash storage device 3 to the host 2.

When the write operation of the write data is failed, the controller 4 executes a write retry operation (rewrite operation) of writing the write data to a write destination location in the other block that is different from the current write destination block. The address change request is used to change the physical address of the write data of which the host 2 is already notified to a new physical address.

The address change request may include the QoS domain ID, the tag, a previous physical address, and a new physical address. The QoS domain ID is an identifier of the QoS domain to which the write data is to be written. The tag is an identifier of the data to be written. The previous physical address is indicative of a physical storage location of which the host 2 is already notified by the address record request. The previous physical address is represented by the block address and the offset. The new physical address is indicative of a physical storage location to which the data is written by write retry. The new physical address is represented by the block address and the offset.

On the basis of the address change request received from the flash storage device 3, the host 2 can update LUT corresponding to this QoS domain such that the new physical address (block address and offset) indicative of the storage location where the write data is written by the write retry operation is associated with the tag (for example, LBA) of the write data.

FIG. 12 illustrates the block address and offset which define the physical address.

The block address designates a certain block BLK. Each of the blocks BLK includes plural pages (page 0 to page n in this case) as illustrated in FIG. 12.

In a case where the page size (user data storing area of each page) is 16K bytes and the grain is the size of 4 KB, this block BLK is logically divided into 4×(n+1) regions.

Offset +0 is indicative of a first 4 KB region of page 0, offset +1 is indicative of a second 4 KB region of page 0, offset +2 is indicative of a third 4 KB region of page 0, and offset +3 is indicative of a fourth 4 KB region of page 0.

Offset +4 is indicative of a first 4 KB region of page 1, offset +5 is indicative of a second 4 KB region of page 1, offset +6 is indicative of a third 4 KB region of page 1, and offset +7 is indicative of a fourth 4 KB region of page 1.

For example, if 4K-byte data corresponding to a write command designating certain LBA (LBAx) is written to the location of block BLK which corresponds to offset +0, the controller 4 may return the tag (=LBAx), the block address (=BLK), the offset (=+0), and the length (=1) to the host 2 as the address record request.

For example, if writing 8K-byte data corresponding to a write command designating certain LBA (LBAx) to offset +0 of the block BLK and writing 8K-byte data corresponding to a write command designating certain LBA (LBAy) to offset +2 of the block BLK are determined, the controller 4 may return to the host 2 the tag (=LBAx), the block address (=BLK), the offset (=+0), the length (=2), the tag (=LBAy), the block address (=BLK), the offset (=+2), and the length (=2) as the address record request. Alternatively, the controller 4 may return to the host 2 the tag and the physical address (block address and offset) as the address record request per minimum write unit (4 KB in this case). In this case, the controller 4 may return to the host 2 the tag (=LBAx), the block address (=BLK), the offset (=+0), the tag (=LBAx+1), the block address (=BLK), the offset (=+1), the tag (=LBAy), the block address (=BLK), the offset (=+2), the tag (=LBAy+1), the block address (=BLK), and the offset (=3) as the address record request.

If the sum of the size of the write data corresponding to the write commands designating the same QoS domain ID becomes a predetermined size such as a page size, the controller 4 retrieves the write data from the write buffer of the host 2 and writes the write data to the write destination page of the block BLK.

FIG. 13 illustrates a relationship between the block address and the offset in a case of using a super block.

To simplify the illustration, one superblock SB #1 is assumed to be composed of four blocks BLK #11, BLK #21, BLK #31, and BLK #41. A block address (super block address) of super block SB #1 is SB #1. Four blocks BLK #11, BLK #21, BLK #31, and BLK #41 may be blocks selected from four different NAND flash memory chips, respectively.

The data are written in order of page 0 of block BLK #11, page 0 of block BLK #21, page 0 of block BLK #31, page 0 of block BLK #41, page 1 of block BLK #11, page 1 of block BLK #21, page 1 of block BLK #31, page 1 of block BLK #41, . . . by the controller 4.

Offset +0 is indicative of a first 4 KB area of page 0 of block BLK #11, offset +1 is indicative of a second 4 KB area of page 0 of block BLK #11, offset +2 is indicative of a third 4 KB area of page 0 of block BLK #11, and offset +3 is indicative of a fourth 4 KB area of page 0 of block BLK #11.

Offset +4 is indicative of a first 4 KB area of page 0 of block BLK #21, offset +5 is indicative of a second 4 KB area of page 0 of block BLK #21, offset +6 is indicative of a third 4 KB area of page 0 of block BLK #21, and offset +7 is indicative of a fourth 4 KB area of page 0 of block BLK #21.

Similarly, offset +12 is indicative of a first 4 KB area of page 0 of block BLK #41, offset +13 is indicative of a second 4 KB area of page 0 of block BLK #41, offset +14 is indicative of a third 4 KB area of page 0 of block BLK #41, and offset +15 is indicative of a fourth 4 KB area of page 0 of block BLK #41.

Offset +16 is indicative of a first 4 KB area of page 1 of block BLK #11, offset +17 is indicative of a second 4 KB area of page 1 of block BLK #11, offset +18 is indicative of a third 4 KB area of page 1 of block BLK #11, and offset +19 is indicative of a fourth 4 KB area of page 1 of block BLK #11.

Offset +20 is indicative of a first 4 KB area of page 1 of block BLK #21, offset +21 is indicative of a second 4 KB area of page 1 of block BLK #21, offset +22 is indicative of a third 4 KB area of page 1 of block BLK #21, and offset +23 is indicative of a fourth 4 KB area of page 1 of block BLK #21.

Similarly, offset +28 is indicative of a first 4 KB area of page 1 of block BLK #41, offset +29 is indicative of a second 4 KB area of page 1 of block BLK #41, offset +30 is indicative of a third 4 KB area of page 1 of block BLK #41, and offset +31 is indicative of a fourth 4 KB area of page 1 of block BLK #41.

For example, if 4K-byte data corresponding to the write command designating certain LBA (LBAx) is written to the location corresponding to offset +8, the controller 4 may return to the host 2 the logical address (=LBAx), the block address (=SB #1), the offset (=+8), and the length (=1) as the address record request.

FIG. 14 illustrates plural QoS domains managed by the flash storage device 3.

FIG. 14 explicitly illustrates a case where QoS domain #0, QoS domain #1, QoS domain #2, . . . , QoS domain #n−1 are already created. In FIG. 14, these QoS domains are represented by squares. A vertical width of a square representing a certain QoS domain is indicative of the capacity of this QoS domain.

User application #0 can make a read/write access to the QoS domain #0 with the read/write command including the QoS domain ID #0 of the QoS domain #0. Similarly, user application #n−1 can make a read/write access to the QoS domain #n−1 with the read/write command including the QoS domain ID #n−1 of the QoS domain #n−1.

FIG. 15 illustrates data write processing executed by the host 2 and the flash storage device 3.

(1) In the host 2, host FTL 701 is run. The host FTL 701 manages mapping between each of the tags such as LBAs and each of the physical addresses of the flash storage device 3, with LUT. In response to a write request from a certain user application, the host FTL 701 transmits a write command designating QoS domain ID of a QoS domain corresponding to this user application, tag, and write buffer address to the flash storage device 3. The host FTL 701 needs only to designate the QoS domain ID alone and does not need to designate a block to which the data is to be written or a page to which the data is to be written. For this reason, the host FTL 701 does not need to manage defective blocks, defective pages, and the like in the flash storage device 3.

(2) The controller 4 of the flash storage device 3 selects one of the blocks of the common block group (free block group) 602 shaped by plural QoS domains 601. The controller 4 allocates the selected block as a write destination block for the QoS domain having the QoS domain ID designated by the received write command. In the common block group (free block group) 602, the only free blocks other than the defective blocks may be managed. For example, a block having the least number of program/erase cycles may be selected from the common block group 602. The controller 4 determines the write destination block as the block to which the data is to be written, and further determines a write destination location in the write destination block to which the data is to be written. As described above, if the write destination block for this QoS domain is already allocated, the controller 4 needs only to determine the already allocated write destination block as the block to which the data is to be written, and does not need to execute the operation of allocating one of the blocks of the common block group 602 as the write destination block for QoS domain.

(3) The controller 4 transmits to the host 2 an address record request including the tag of the write data, the block address indicative of the determined write destination block, and the offset indicative of the determined write destination location, and thereby notifies the host 2 of the physical address to which the write data associated with this write command is written.

(4) The controller 4 retrieves write data from the write buffer 702 of the host 2, based on the write buffer address included in the write command. The retrieval of the write data from the write buffer 702 may be executed by DMA transfer. Then, the controller 4 executes a data write operation of writing the write data to the write destination location in the write destination block.

(5) After writing the write data is finished such that the write data becomes readable from the NAND flash memory 5, the controller 4 sends to the host 2 a release request to release the region in the write buffer 702 where the write data is stored. This release request may include an identifier of the write command corresponding to the write data having its writing completed. Alternatively, this release request may include a write buffer address indicative of the storage location of the write data and a length of the write data. The host 2 releases the region in the write buffer 702 where the write data is stored, in response to the release request. The released region in the write buffer 702 is usable for storing the other write data, and the like.

FIG. 16 illustrates the data write operation executed by plural write steps including transferring the same write data to the NAND flash memory 5 at plural times.

An example of the foggy fine write operation executed in four word lines back and forth will be described. In addition, it is assumed that the NAND flash memory 5 is a QLC-flash which stores 4-bit data per memory cell. The foggy fine write operation for one specific write destination block (write destination block BLK #1) in the NAND flash memory 5 is executed in the manner described below.

(1) First, write data corresponding to four pages (20 to 23) are transferred in page unit to the NAND flash memory 5 and the foggy write operation for writing the write data corresponding to four pages (P0 to P3) to plural memory cells connected to the word line WL0 in this write destination block BLK #1 is executed.

(2) Next, write data corresponding to four pages (P4 to P7) are transferred in page unit to the NAND flash memory 5 and the foggy write operation for writing the write data corresponding to four pages (P4 to P7) to plural memory cells connected to the word line WL1 in this write destination block BLK #1 is executed.

(3) Next, write data corresponding to four pages (P8 to P11) are transferred in page unit to the NAND flash memory 5 and the foggy write operation for writing the write data corresponding to four pages (P8 to P11) to plural memory cells connected to the word line WL2 in this write destination block BLK #1 is executed.

(4) Next, write data corresponding to four pages (P12 to P15) are transferred in page unit to the NAND flash memory 5 and the foggy write operation for writing the write data corresponding to four pages (P12 to P15) to plural memory cells connected to the word line WL3 in this write destination block BLK #1 is executed.

(5) When the foggy write operation for the plural memory cells connected to the word line WL3 is finished, the word line of the write target returns to the word line WL0 and the fine write operation for the plural memory cells connected to the word line WL0 can be executed. Then, the write data corresponding to four pages (P0 to P3) that are the same as the write data corresponding to four pages (P0 to P3) used in the foggy write operation for the word line WL0 are transferred again in page unit to the NAND flash memory 5, and the fine write operation for writing the write data corresponding to four pages (P0 to P3) to the plural memory cells connected to the word line WL0 in the write destination block BLK #1 is executed. The foggy fine write operation for pages P0 to P3 is thereby finished. As a result, the data of four pages (P0 to P3) can be read.

(6) Next, write data corresponding to four pages (P16 to P19) are transferred in page unit to the NAND flash memory 5 and the foggy write operation for writing the write data corresponding to four pages (P16 to P19) to plural memory cells connected to the word line WL4 in this write destination block BLK #1 is executed.

(7) When the foggy write operation corresponding to the plural memory cells connected to the word line WL4 is finished, the word line of the write target returns to the word line WL1 and the fine write operation for the plural memory cells connected to the word line WL1 can be executed. Then, the write data corresponding to four pages (P4 to P7) that are the same as the write data corresponding to four pages (P4 to P7) used in the foggy write operation for the word line WL1 are transferred again in page unit to the NAND flash memory 5, and the fine write operation for writing the write data corresponding to four pages (P4 to P7) to the plural memory cells connected to the word line WL1 in the write destination block BLK #1 is executed. The foggy fine write operation of pages P4 to P7 is thereby finished. As a result, the data of four pages (P4 to P7) can be read.

(8) Next, write data corresponding to four pages (P20 to P23) are transferred in page unit to the NAND flash memory 5 and the foggy write operation for writing the write data corresponding to four pages (P20 to 223) to plural memory cells connected to the word line WL5 in this write destination block BLK #1 is executed.

(9) When the foggy write operation for the plural memory cells connected to the word line WL5 is finished, the word line of the write target returns to the word line WL2 and the fine write operation for the plural memory cells connected to the word line WL2 can be executed. Then, the write data corresponding to four pages (P8 to P11) that are the same as the write data for four pages (P8 to P11) used in the foggy write operation for the word line WL2 are transferred again in page unit to the NAND flash memory 5, and the fine write operation for writing the write data corresponding to four pages (P8 to P11) to the plural memory cells connected to the word line WL2 in the write destination block BLK #1 is executed. The foggy fine write operation for pages P8 to P11 is thereby finished. As a result, the data of four pages (P8 to P11) can be read.

FIG. 17 illustrates data write processing and data write retry processing executed by the host 2 and the flash storage device 3.

(1) The host FTL 701 transmits a write command designating QoS domain ID, tag, and write buffer address to the flash storage device 3.

(2) The controller 4 of the flash storage device 3 selects one of the blocks of the common block group (free block group) 602 shaped by plural QoS domains 601. The controller 4 allocates the selected block as a write destination block for the QoS domain having the QoS domain ID designated by the received write command. In the common block group (free block group) 602, the only free block group other than the defective blocks may be managed. For example, a block having the least number of program/erase cycles may be selected from the common block group 602. The controller 4 determines the write destination block as the block to which the data is to be written, and further determines a write destination location in the write destination block to which the data is to be written.

(3) The controller 4 transmits to the host 2 an address record request including the tag of the write data, the block address indicative of the determined write destination block, and the offset indicative of the determined write destination location, and thereby notifies the host 2 of the physical address to which the write data associated with this write command is written.

(4) The controller 4 retrieves write data from the write buffer 702 of the host 2, based on the write buffer address included in the write command. The retrieval of the write data from the write buffer 702 may be executed by DMA transfer. Then, the controller 4 executes a data write operation of writing the write data to the write destination location in the write destination block.

(5) If the data write operation is failed, the controller 4 executes the write retry operation of writing the write data to a write destination location in the other block that is different from the current write destination block. In this case, first, the controller 4 determines a write destination block to which the write data is to be written, and a write destination location in the write destination block to which the write data is to be written. For example, in a case where one of physical blocks belonging to a certain super block is used as the current write destination block, the write data is rewritten to the other physical block in this super block. For example, if the operation of writing the write data to a page (page 0 of block #BLK21) starting from offset +4 is failed, in the super block of FIG. 13, a subsequent page (page 0 of block #BLK31) starting from offset +8 may be a write destination. In this case, the write destination block is changed from the block #BLK21 to block #BLK31.

(6) The controller 4 retrieves again the write data from the write buffer 702 of the host 2, based on the write buffer address included in the write command in which write is failed. The retrieval of the write data from the write buffer 702 may be executed by DMA transfer. Then, the controller 4 executes a data rewrite operation of writing the write data to the write destination location in the write destination block (for example, page 0 of block #BLK31). Thus, write retry is executed for the new write destination block different from the block in which the write operation has been failed. For this reason, in general, the write retry operation is succeeded.

(7) The controller 4 notifies the host 2 of an identifier of the write data, a block address of the new write destination block, and an offset indicative of the write destination location in the new write destination block.

(8) After writing the write data is finished such that the write data becomes readable from the NAND flash memory 5, the controller 4 sends to the host 2 a release request to release the region in the write buffer 702 where the write data is stored.

FIG. 18 illustrates data read processing executed by the host 2 and the flash storage device 3.

(1) When the host FTL 701 receives the read request from a certain user application, the host FTL 701 retrieves the physical address corresponding to the tag such as LBA designated by the read request by referring to LUT in the host FTL 701. The host FTL 701 transmits to the flash storage device 3 the read command to designate the QoS domain ID of the QoS domain corresponding to this user application, the retrieved physical address (block address and offset), the length, and the read buffer address.

(2) When the controller 4 receives this read command, the controller 4 reads the data from the NAND flash memory 5, based on the block address and offset designated by this read command. Then, the controller 4 transfers the read data to a location in the read buffer 703 of the host 2, which is designated by the read buffer address, by using DMA transfer.

FIG. 19 illustrates data read processing of reading the data from a write buffer of the host 2 in a case where the write operation of the data designated by the read command is not finished.

(1) When the host FTL 701 receives the read request from a certain user application, the host FTL 701 retrieves the physical address corresponding to the tag such as LBA designated by the read request by referring to LUT in the host FTL 701. The host FTL 701 transmits to the flash storage device 3 the read command to designate the QoS domain ID of the QoS domain corresponding to this user application, the retrieved physical address (block address and offset), the length, and the read buffer address.

(2) When the controller 4 receives this read command, the controller 4 determines whether the operation of writing the read target data designated by the read command is finished or not, based on the block address, offset and length designated by this read command. If the block having the designated block address is a block in a closed state, it is determined that the write operation of the read target data designated by the read command has been finished.

In contrast, if the block having the designated block address is a block in an opened state, it is determined whether the write operation of the read target data has been finished or not, based on a current write destination page range of the block. If the location in this block where the read target data is stored belongs to a page prior to the current write destination page range, it is determined that the operation of writing the read target data is finished. If the location in this block where the read target data is stored belongs to any page in the current write destination page range, it is determined that the operation of writing the read target data is not finished.

In a case where the operation of writing the read target data is not finished and the read target data cannot be read from the NAND flash memory 5, the controller 4 reads the read target data from the write buffer of the host 2 by using DMA transfer. The location in the write buffer corresponding to each of write data parts written to the block (write destination block) in the opened state may be managed with a write buffer list prepared for each write destination block. In a write buffer address list corresponding to a certain write destination block, the write buffer address where the write data is stored and the offset indicative of the write destination location corresponding to the write data may be recorded for each write data determined to be written to the write destination block. The controller 4 may specify the write buffer address where the read target data is stored, by referring to the write buffer address list corresponding to the write destination block having the block address in the read command.

(3) The controller 4 transfers the data read from the write buffer to a location in the read buffer 703 of the host 2, which is designated by the read buffer address, by using DMA transfer.

Figure 20:
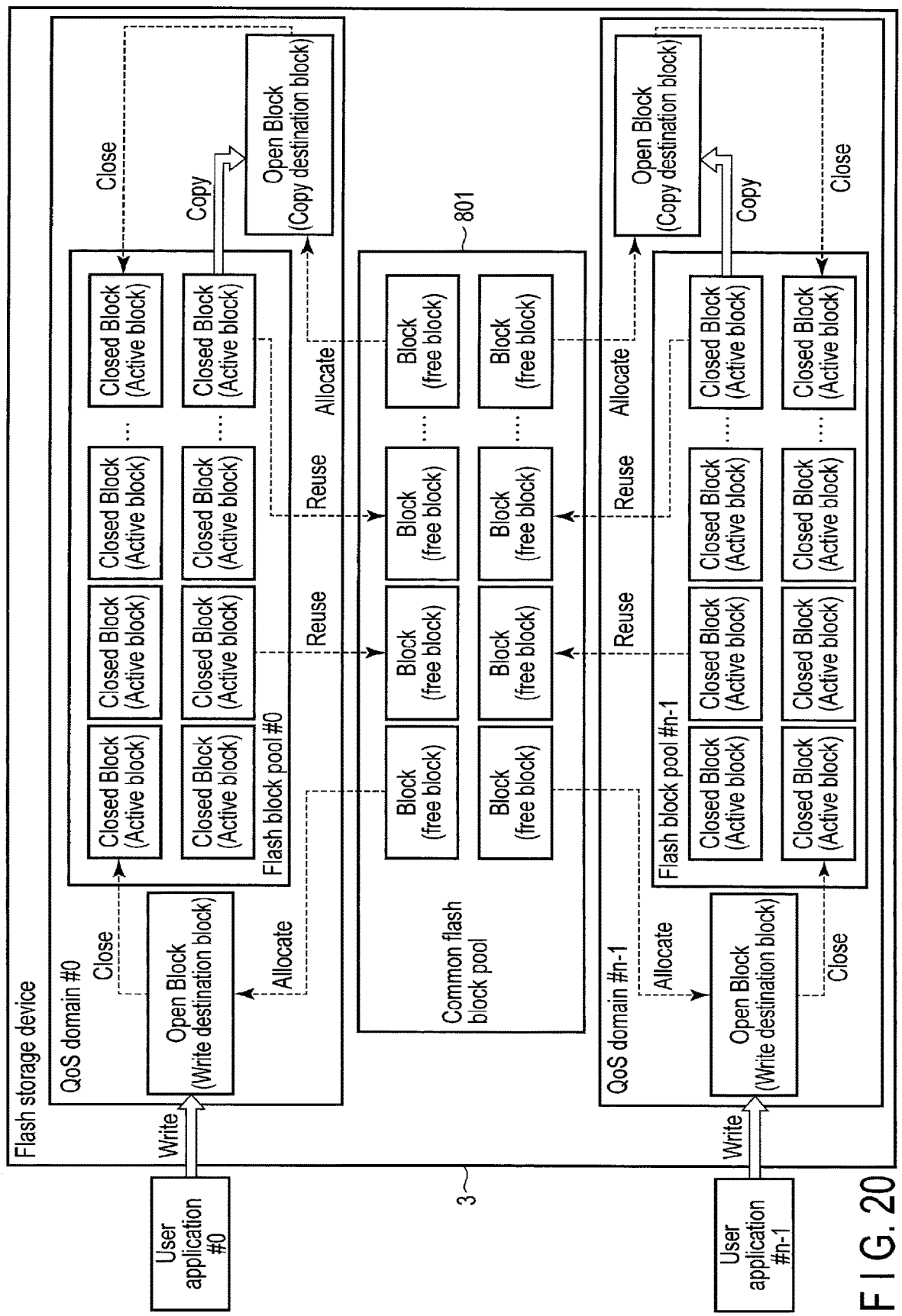
FIG. 20 is a block diagram illustrating a relationship between QoS domains and a common flash block pool as managed by the memory system of the embodiment.

FIG. 20 illustrates a relationship between plural QoS domains and the common flash block pool, which is managed by the controller 4 of the flash storage device 3.

In FIG. 20, two QoS domains alone, i.e., QoS domain #0 and QoS domain #n−1, are illustrated to simplify the illustration. A common flash block pool 801 is a list to manage the above-described common block group 602 shared by the QoS domains.

Flash block pool #0 of the QoS domain #0 is the above-described active block list for management of each of the active blocks belonging to the QoS domain #0.

When the controller 4 receives the write command to designate QoS domain ID #0 of the QoS domain #0, the controller 4 determines whether the write destination block (opened block) for QoS domain #0 is already allocated or not.

If the write destination block (opened block) is not already allocated, the controller 4 allocates a free block in the common flash block pool 801 as the write destination block (opened block) for QoS domain #0. The controller 4 determines the write destination location in the write destination block, and writes the write data associated with the write command to the write destination location in the write destination block.

In contrast, if the write destination block (open block) is already allocated, the controller 4 determines the write destination location in the write destination block, and writes the write data associated with the write command to the write destination location in the write destination block.

When the whole write destination block is filled with the data from the host, the controller 4 manages the write destination block by the flash block pool #0 (i.e., this write destination block is closed), and allocates a free block in the common flash block pool 801 as a new write destination block (opened block) for QoS domain #0.

When the controller 4 receives the copy command designating the copy source QoS domain indicative of the QoS domain ID #0, the block address of the copy source block, and the copy source QoS domain indicative of the QoS domain ID #0, the controller 4 determines whether the copy destination block (opened block) for QoS domain #0 is already allocated or not.

If the copy destination block (opened block) is not already allocated, the controller 4 allocates a free block in the common flash block pool 801 as the copy destination block (opened block) for QoS domain #0. Then, the controller 4 selects the block in the flash block pool #0 as the copy source block, based on the block address of the copy source block, and copies the data in the selected copy source block to the copy destination block. In a case where the map data has been received from the host 2, the controller 4 copies each of valid data in the selected copy source block to the copy destination block, based on the map data.

In contrast, if the copy destination block is already allocated, the controller 4 copies the data in the selected copy source block to the copy destination block.

When the whole copy destination block is filled with the data from the host, the controller 4 manages the copy destination block by the flash block pool #0 (i.e., the copy destination block is closed), and allocates a free block in the common flash block pool 801 as a new copy destination block (opened block) for QoS domain #0.

If the whole data in one of the blocks belonging to the QoS domain #0 become invalid data by the write operation of updated data or the data copy operation, the host 2 transmits a reuse command to designate the block address of this block to the flash storage device 3.

When the controller 4 receives the reuse command from the host 2, the controller 4 returns the block in the flash block pool #0 designated by the reuse command to the common flash block pool 801 and thereby sets this block to be in a reusable state as a new write destination block (or copy destination block) for optional QoS domain.

If the whole data in one of the blocks belonging to the QoS domain #0 become invalid data by the updated data write operation or the data copy operation, the host 2 may transmit an erase command to designate the block address of this block to the flash storage device 3. When the controller 4 receives the erase command from the host 2, the controller 4 executes the erase operation for the block in the flash block pool #0 designated by the erase command, returns this block to the common flash block pool 801, and thereby sets this block to be in a reusable state of being reusable as a new write destination block (or copy destination block) for optional QoS domain.

In QoS domain #n−1, too, the controller 4 executes allocation of the write destination block/copy destination block, processing of managing the write destination block/copy destination block filled with the data by the flash block pool #n−1, processing of returning the block designated by the reuse command/erase command to the common flash block pool 801, and the like.

Figure 21:
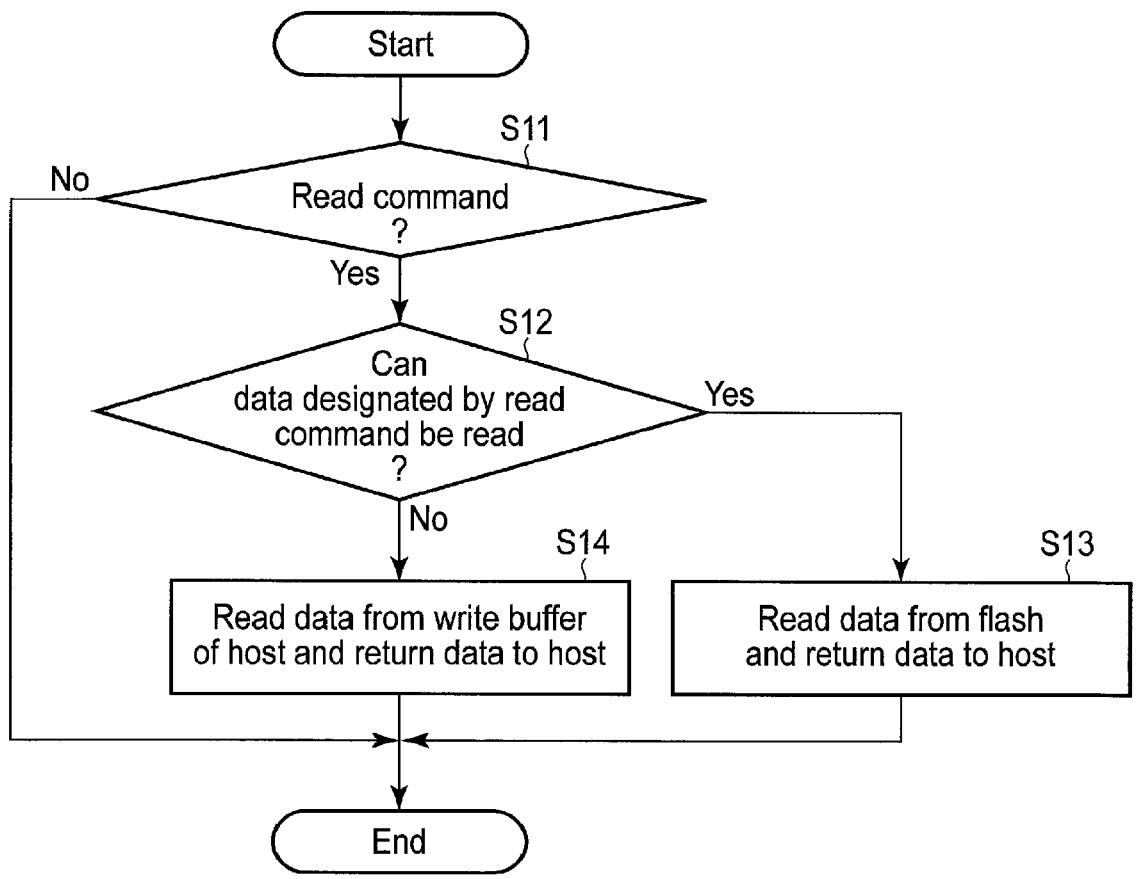
FIG. 21 is a flowchart illustrating a procedure of data read processing executed by the memory system of the embodiment.

The flowchart of FIG. 21 illustrates a procedure of the data read operation.

When the controller 4 receives from the host 2 the read command designating the physical address (block address and offset) indicative of the storage location where the data to be read is stored (YES in step S11), the controller 4 determines whether the operation of writing the data (read target data) of the storage location has been already finished such that the data becomes readable from the NAND flash memory 5 or not (step S12).

In step S12, the controller 4 determines whether the block having the block address designated by the read command is in a closed state or an opened state. If the block is in a closed state, the operation of writing the read target data has been already finished. The controller 4 therefore determines that the read target data is readable from the NAND flash memory 5.

In contrast, if this block is in an opened state, the controller 4 determines whether the location in this block where the read target data is stored belongs to a page prior to the current write destination page range of this block or not. If the location in this block where the read target data is stored belongs to a page prior to the current write destination page range of this block, the operation of writing the read target data has been already finished. The controller 4 therefore determines that the read target data is readable from the NAND flash memory 5.

If the location in this block where the read target data is stored does not belong to a page prior to the current write destination page range of this block but belongs to any page in the current write destination page range, the operation of writing the read target data is not finished. The controller 4 therefore determines that the read target data is not readable from the NAND flash memory 5.

In a case where the read target data can be read from the NAND flash memory 5 (YES in step S12), the controller 4 reads the read target data from the NAND flash memory 5 and returns the read data to the host 2 (step S13).

In a case where the read target data is not readable from the NAND flash memory 5 (NO in step S12), i.e., in a case where the read command designating the read target data is received before the operation of writing the data designated as the read target data is finished such that the read target data becomes readable, the controller 4 reads the read target data from the write buffer of the host 2 and returns the read target data to the host 2 (step S14). The write buffer address corresponding to each of the write data which are being written to a certain write destination block is registered in the write buffer address list corresponding to the write destination block.

Therefore, the controller 4 can retrieve the write buffer address corresponding to the read target data, by referring to the write buffer address list corresponding to the write destination block specified by the block address in the read command.

Figure 22:
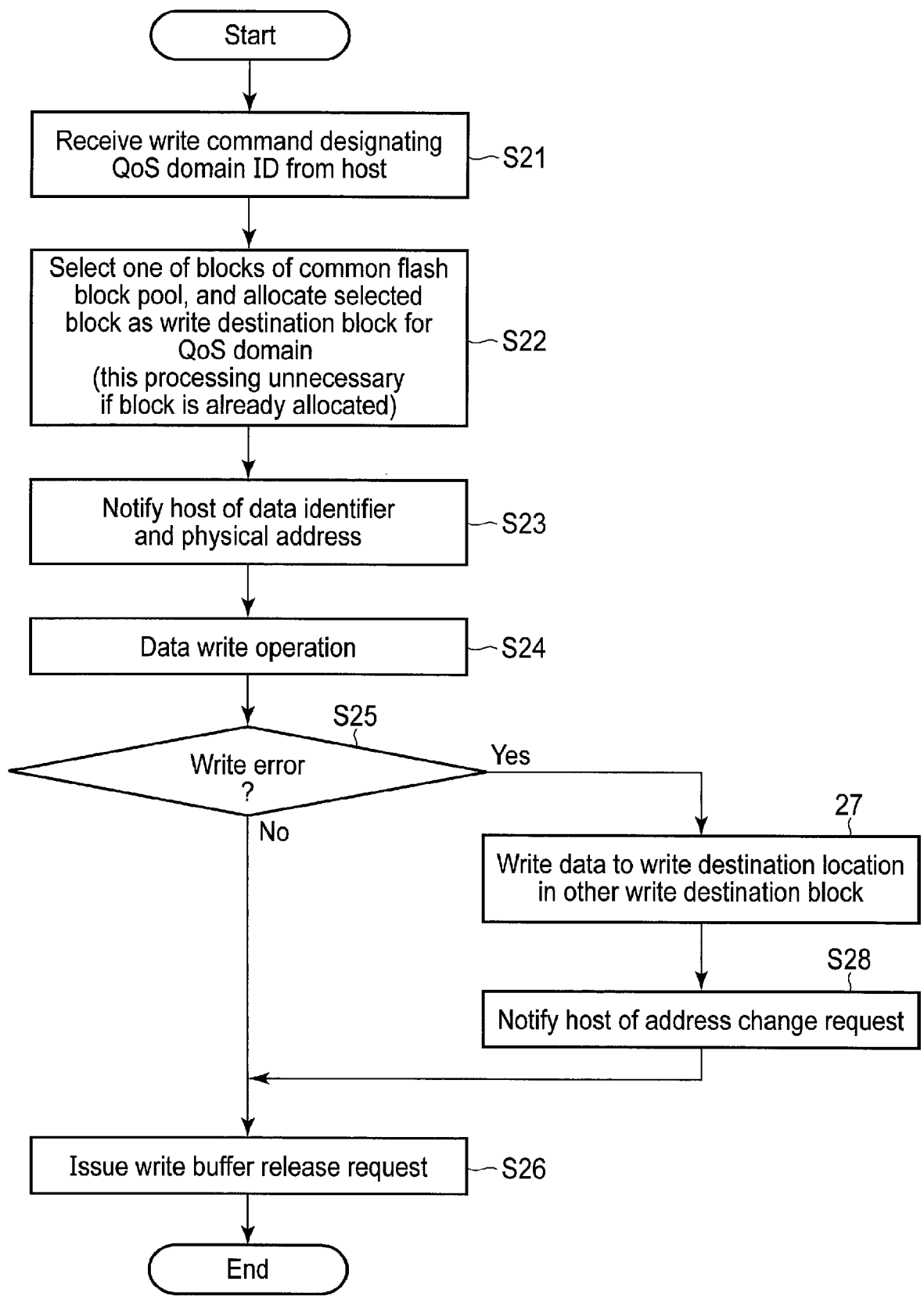
FIG. 22 is a flowchart illustrating a procedure of data write processing and data write retry processing executed by the memory system of the embodiment.

The flowchart of FIG. 22 illustrates a procedure of the data read operation and the write buffer release processing.

When the controller 4 receives from the host 2 a write command to designate a QoS domain ID, a tag, and a write buffer address (step S21), the controller 4 selects one of blocks (free blocks) in the common flash block pool 801 and allocates the selected block as a write destination block for the QoS domain corresponding to the QoS domain ID designated by the write command. The controller 4 determines the write destination block as the block to which the write data associated with the write command is to be written, and further determines a write destination location in the write destination block to which the write data is to be written (step S22). If the write destination block for QoS domain is already allocated, the controller 4 needs only to determine the already allocated write destination block as the block to which the write data is to be written, and does not need to execute the operation of allocating one of the blocks of the common block group 602 as the write destination block for QoS domain.

The controller 4 notifies the host 2 of the tag of the write data, and the physical address indicative of the storage location to which the write data is to be written, as the address record request (step S23). The physical address indicative of the storage location to which the write data is to be written includes the block address of the write destination block determined as the block to which the write data is to be written, and the offset indicative of the determined write destination location in the write destination block.

The controller 4 retrieves write data from the write buffer of the host 2, based on the write buffer address included in the write command. Then, the controller 4 executes a data write operation of writing the write data to the write destination location in the write destination block (step S24). The data write operation is executed in page units. For this reason, the controller 4 may execute the following processing. (1) Every time the controller 4 receives the write command from the host 2, the controller 4 registers the write buffer address in the received write command in a write buffer address list corresponding to the current write destination block. (2) The controller 4 determines the physical address (block address and offset) to which the write data existing in this write buffer address is to be written and notifies the host 2 of this physical address as the address record request. (3) When the total size of the write data corresponding to the respective write commands reaches a predetermined size, the controller 4 executes the data write operation.

In a case where the data write operation of the write data is successfully finished such that the write data becomes readable from the NAND flash memory (NO in step S25), the controller 4 transmits to the host 2 a write buffer release request to release the region in the write buffer where the write data is stored (step S26).

In a case where the data write operation of the write data is failed (YES in step S25), the controller 4 retrieves again the write data from the write buffer of the host 2 and executes a write retry operation of writing the write data to a write destination location in the other block that is different from the current write destination block (step S27). The controller 4 notifies the host 2 of the tag of the write data, the block address of the different block, and the offset indicative of the write destination location in the different block as the address change request (step S28). When the rewrite operation of the write data is finished such that the write data becomes readable from the NAND flash memory, the controller 4 transmits to the host 2 a write buffer release request to release the region in the write buffer where the write data is stored (step S26).

As described above, in the embodiments, the host 2 is notified of the physical address of each of the write data from the flash storage device 3 before the write data are actually written to the NAND flash memory 5. Thus, since the host 2 can recognize the physical address of each of the write data at early timing, the host 2 can efficiently create the read command designating the physical address indicative of the storage location where the data to be read is stored.

In addition, in the embodiments, in a case where a read command designating write data is received from the host 2 before the operation of writing the write data is finished (for example, both the foggy write operation and the fine write operation are finished) such that the write data becomes readable, the read target data is read from the write buffer of the host 2. Therefore, the host 2 can receive desired data from the flash storage device 3 by merely executing simple processing of issuing the read command to the flash storage device 3 without executing the processing of checking whether the data to be read can be read from the NAND flash memory 5 or not and the processing of selectively issuing the read request to the write buffer and the read command to the flash storage device 3.

The burden on the host 2 side on the data write/read can be therefore reduced.

In the embodiments, if the read command designating the write data as the read target data is received from the host 2 before the operation of writing the write data is finished such that the write data becomes readable from the NAND flash memory 5, the controller 4 reads the read target data from the write buffer. In the other embodiment, however, if the read command designating the write data as the read target data is received from the host 2 before the operation of writing the write data is finished such that the write data becomes readable from the NAND flash memory 5, the controller 4 may transmit to the host 2 the transfer request to require the read target data to be returned from the write buffer as a response to the read command. This transfer request may include storage location information indicative of the location in the write buffer where the read target data are stored.

In response to reception of the transfer request, the host FTL 701 of the host 2 reads the read target data from the write buffer and transfers the read target data to the read buffer. Then, the host FTL 701 returns a response to the transfer request to the flash storage device 3. The controller 4 may handle reception of this response as completion of execution of this read command. In this case, the controller 4 prohibits the release of the region in the write buffer where the write data is stored until this response is received. After receiving this response, the controller 4 transmits to the host 2 a release request to release the region in the write buffer where the write data is stored. In this case, the controller 4 may transmit to the host 2 a release request to release the region in the write buffer where the write data is stored, after the operation of writing the write data is finished such that the write data becomes readable from the NAND flash memory 5 and this response is received.

In the embodiments, a NAND flash memory is illustrated as an example of a nonvolatile memory. However, the functions of the present embodiment are also applicable to various other nonvolatile memories such as a magnetoresistive random access memory (MRAM), a phase change random access memory (PRAM), a resistive random access memory (ReRAM) and a ferroelectric random access memory (FeRAM).

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system connectable to a host, the memory system comprising:
   a nonvolatile memory including a plurality of blocks; and
   a controller electrically connected to the nonvolatile memory and configured to control the nonvolatile memory, wherein
   the controller is configured to:
   receive from the host a write command to designate storage location information indicative of a storage location in a write buffer of the host where write data is stored;
   determine a write destination block to which the write data is to be written, and a write destination location in the write destination block to which the write data is to be written;
   notify the host of an identifier of the write data, a block address of the write destination block, and an offset indicative of the write destination location in the write destination block;
   retrieve the write data from the write buffer of the host on a basis of the storage location information, and write the write data to the write destination location in the write destination block;
   receive from the host a read command to designate a physical address indicative of a storage location where first data to be read is stored;
   in a case where a write operation of the first data is already finished such that the first data is readable from the nonvolatile memory, read the first data from the nonvolatile memory; and
   in a case where the read command is received before the write operation of the first data is finished such that the first data becomes readable, read the first data from the write buffer of the host.

2. The memory system of claim 1, wherein
   the controller is configured, in a case where the write operation of the write data is failed, to write the write data to a write destination location in the other block that is different from the write destination block, and to notify the host of an identifier of the write data, a block address of the other block, and an offset indicative of the write destination location in the other block, as an address change request.

3. The memory system of claim 2, wherein
   the controller is configured, in a case where the write operation of the write data is failed, to retrieve again the write data from the write buffer.

4. The memory system of claim 1, wherein
   the controller is configured to transmit to the host a release request to release a region in the write buffer where the write data is stored, after the write operation of the write data is finished such that the write data becomes readable.

5. A memory system connectable to a host, the memory system comprising:
   a nonvolatile memory including a plurality of blocks; and
   a controller electrically connected to the nonvolatile memory and configured to control the nonvolatile memory, wherein
   the controller is configured to:
   receive from the host a write command to designate a first identifier of a plurality of identifiers to access a plurality of regions each being a subset of the blocks, an identifier of the write data, and storage location information indicative of a storage location in a write buffer of the host where write data is stored;
   allocate one of blocks of a common free block group shared by the regions as a write destination block for a region corresponding to the first identifier, and determine a write destination location in the write destination block to which the write data is to be written;
   notify the host of an identifier of the write data, a block address of the write destination block, and an offset indicative of the write destination location in the write destination block;
   retrieve the write data from the write buffer of the host on [Men a basis of the storage location information, and write the write data to the write destination location in the write destination block;
   receive from the host a read command to designate a physical address indicative of a storage location where first data to be read is stored;
   in a case where a write operation of the first data is already finished such that the first data is readable from the nonvolatile memory, read the first data from the nonvolatile memory; and
   in a case where the read command is received before the write operation of the first data is finished such that the first data becomes readable, read the first data from the write buffer of the host.

6. The memory system of claim 5, wherein
the controller is configured, in a case where the write operation of the write data is failed, to write the write data to a write destination location in the other block that is different from the write destination block, and to notify the host of an identifier of the write data, a block address of the other block, and an offset indicative of the write destination location in the other block; as an address change request.

7. The memory system of claim 6, wherein
the controller is configured; in a case where the write operation of xe write data is failed, to retrieve again the write data from the write buffer.

8. The memory system of claim 5, wherein
the controller is configured to transmit to the host a release request to release a region in the write buffer where the write data is stored, after the write operation of the write data is finished such that the write data becomes readable.

9. A method of controlling a nonvolatile memory including a plurality of blocks, the method comprising:
receiving from a host a write command to designate storage location information indicative of a storage location in a write buffer of the host where write data is stored;
determining a write destination block to which the write data is to be mitten, and a write destination location in the write destination block to which the write data is to be written;
notifying the host of an identifier of the write data, a block address of the write destination block, and an offset indicative of the write destination location in the write destination block;
retrieving the write data from the write buffer of the host on a basis of the storage location information, and writing the write data to the write destination location in the write destination block;
receiving from the host a read command to designate a physical address indicative of a storage location where first data to be read is stored;
in a case where a write operation of the first data is already finished such that the first data is readable from the nonvolatile memory, reading the first data from the nonvolatile memory; and
in a case where the read command is received before the write operation of the first data is finished such that the first data becomes readable, reading the first data from the write buffer of the host.

10. The method of claim 9, further comprising:
in a case where the write operation of the write data is failed, writing the write data to a write destination location in the other block that is different from the write destination block, and notifying the host of an identifier of the write data, a block address of the other block, and an offset indicative of the write destination location in the other block, as an address change request.

11. The method of claim 10, further comprising:
in a case where the write operation of the write data is failed, retrieving again the write data from the write buffer.

12. The method of claim 9, further comprising:
transmitting to the host a release request to release a region in the write buffer where the write data is stored, after the write operation of the write data is finished such that the write data becomes readable.

* * * * *